United States Patent [19]
Tone et al.

[11] Patent Number: 5,715,070
[45] Date of Patent: Feb. 3, 1998

[54] FREELY CONFIGURABLE IMAGE PROCESSING APPARATUS

[75] Inventors: Takeharu Tone; Kouichi Kamon, both of Yokohama; Masaaki Ito, Zama; Yoshiyuki Namizuka, Sagamihara; Hiroyuki Kawamoto, Kawasaki; Anki Yoh, Tokyo, all of Japan

[73] Assignee: Ricoh Company, Ltd., Tokyo, Japan

[21] Appl. No.: 429,273

[22] Filed: Apr. 25, 1995

[30] Foreign Application Priority Data

| Apr. 28, 1994 | [JP] | Japan | 6-092259 |
| Apr. 30, 1994 | [JP] | Japan | 6-114584 |
| Jan. 31, 1995 | [JP] | Japan | 7-014497 |

[51] Int. Cl.$^6$ .............. H04N 1/32; H04N 1/40; G06F 15/00; G03G 21/00
[52] U.S. Cl. .......... 358/468; 358/443; 358/448; 395/114; 399/77
[58] Field of Search ............ 358/296, 400, 358/401, 407, 434, 442, 443, 447, 448, 468, 530; 395/101, 112, 114, 117; 399/1, 2, 38, 46, 75, 77

[56] References Cited

U.S. PATENT DOCUMENTS

| 5,175,824 | 12/1992 | Soderbery et al. | 395/325 |
| 5,262,965 | 11/1993 | Putnam et al. | 395/101 |
| 5,363,175 | 11/1994 | Matysek | 399/77 |
| 5,469,533 | 11/1995 | Dennis | 395/114 |
| 5,604,600 | 2/1997 | Webster | 358/296 |

FOREIGN PATENT DOCUMENTS

| 109 337 A2 | 5/1984 | European Pat. Off. |
| 2 619 462 | 2/1989 | France |
| 63-199568 | 8/1988 | Japan |
| 5-207272 | 8/1993 | Japan |
| 5-268458 | 10/1993 | Japan |

*Primary Examiner*—Eric Frahm
*Attorney, Agent, or Firm*—Lowe, Price, LeBlanc & Becker

[57] ABSTRACT

A freely configurable image processing apparatus comprises a plurality of processing sections each executing a specified processing to a digital image signal; namely a scanner section, a shading section, a filter section, an image size changing section, a γ-conversion section, a tone processing section, an editorial section, a storage section, an external interface section, a printing section, and a plot section, wherein a sequence of processing by these processing section can freely be changed by a selector control section according to an instruction from a main control section by switching a mains elector and an out selector connected to each processing section.

14 Claims, 36 Drawing Sheets flare correcting rate computing section number of pixel : N = 1 3
threshold value : T = 3 2

MTF correction

FIG. 7A

|     | -4 |    |
|-----|----|-----|
| -1 -3 | 24 | -3 -1 |
|     | -4 |    |

1/8

SMTF[3:0] = 0
(for the rate of changing
an image size 25%~64%)

FIG. 7B

|      | -1 |      |
|------|----|------|
|   -2 | -3 | -2   |
| -1 -3 | 35 | -3 -1 |
|   -2 | -3 | -2   |
|      | -1 |      |

1/11

SMTF[3:0] = 1
(for the rate of changing
an image size 65%~154%)

FIG. 7C

|      | -4 |      |
|------|----|------|
|   -2 |  0 | -2   |
| -1 -3 | 35 | -3 -1 |
|   -2 |  0 | -2   |
|      | -4 |      |

1/11

SMTF[3:0] = 2
(for the rate of changing
an image size 155%~256%)

FIG. 7D

|     | -8 |    |
|-----|----|-----|
|     |  0 |    |
| -1 -3 | 32 | -3 -1 |
|     |  0 |    |
|     | -8 |    |

1/8

SMTF[3:0] = 3
(for the rate of changing
an image size 257%~400%)

FIG. 7E

|      | -1 |      |
|------|----|------|
|   -2 | -3 | -2   |
| -1 -3 | 32 | -3 -1 |
|   -2 | -3 | -2   |
|      | -1 |      |

1/8

SMTF[3:0] = 4
(for the rate of changing
an image size 65%~154%)

MTF coefficient for MTF correction

SMTF=1 in the character mode and SMTE=4 in the pencil mode are used.

FIG. 8A

| 1 | 2 | 2 | 2 | 1 |
|---|---|---|---|---|
| 1 | 4 | 4 | 4 | 1 |
| 2 | 4 | 8 | 4 | 2 |
| 1 | 4 | 4 | 4 | 1 |
| 1 | 2 | 2 | 2 | 1 |

SSMT[3:0] = 0    1/64

FIG. 8B

| 0 | 0 | 0 | 0 | 0 |
|---|---|---|---|---|
| 0 | 0 | 0 | 0 | 0 |
| 0 | 0 | 1 | 0 | 0 |
| 0 | 0 | 0 | 0 | 0 |
| 0 | 0 | 0 | 0 | 0 |

SSMT[3:0] = 1    1/1

FIG. 8C

| 1  | -2 | -6 | -2 | 1  |
|----|----|----|----|----|
| -2 | 4  | 12 | 4  | -2 |
| -6 | 12 | 36 | 12 | -6 |
| -2 | 4  | 12 | 12 | -6 |
| 1  | -2 | -6 | -2 | 1  |

SSMT[3:0] = 2    1/64

FIG. 8D

| 1  | -1 | -4 | -1 | 1  |
|----|----|----|----|----|
| -1 | 4  | 10 | 4  | -1 |
| -4 | 10 | 28 | 10 | -4 |
| -1 | 4  | 10 | 4  | -1 |
| 1  | -1 | -4 | -1 | 1  |

SSMT[3:0] = 3    1/64

FIG. 8E

| 1  | 0 | -2 | 0 | 1  |
|----|---|----|---|----|
| 0  | 4 | 8  | 4 | 0  |
| -2 | 8 | 20 | 8 | -2 |
| 0  | 4 | 8  | 4 | 0  |
| 1  | 0 | -2 | 0 | 1  |

SSMT[3:0] = 4    1/64

FIG. 8F

| -1 | 0  | 2  | 0  | -1 |
|----|----|----|----|----|
| 0  | -3 | 2  | -3 | 0  |
| 2  | 2  | 16 | 2  | 2  |
| 0  | -3 | 2  | -3 | 0  |
| -1 | 0  | 2  | 0  | -1 |

SSMT[3:0] = 5    1/16

FIG. 8G

| 0  | 0  | 0  | 0  | 0  |
|----|----|----|----|----|
| -1 | 2  | 6  | 2  | -1 |
| -6 | 12 | 36 | 12 | -6 |
| -1 | 2  | 6  | 2  | -1 |
| 0  | 0  | 0  | 0  | 0  |

SSMT[3:0] = 6    1/64
(for the rate of changing
an image size less than 64%)

FIG. 8H

| -2 | 4 | 8  | 4 | -2 |
|----|---|----|---|----|
| 0  | 0 | 0  | 0 | 0  |
| -4 | 8 | 32 | 8 | -4 |
| 0  | 0 | 0  | 0 | 0  |
| -2 | 4 | 8  | 4 | -2 |

SSMT[3:0] = 7    1/64
(for the rate of changing
an image size less than 155%)

filter coefficient for smoothing processing

FIG. 9
Laplacian
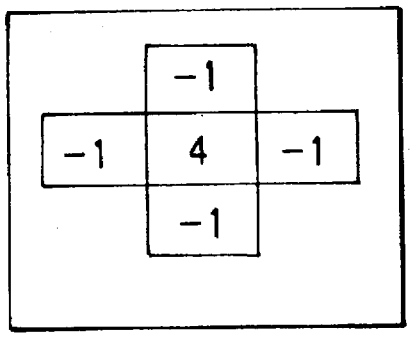
FIG. 10
2 × 2 expansion processing
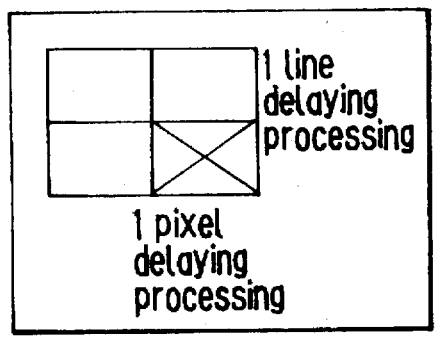
1 line delaying processing
1 pixel delaying processing
FIG. 11
blank space candidate detection pattern
| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23 | 24 | 25 |
(1&2&3&4&5&6&7&8&9&10) ||
(6&7&8&9&10&11&12&13&14&15) ||
(11&12&13&14&15&16&17&18&19&20) ||
(16&17&18&19&20&21&22&23&24&25) ||
(1&6&11&16&21&2&7&12&17&22) ||
(2&7&12&17&22&3&8&13&18&23) ||
(3&8&13&18&23&4&9&14&19&24) ||
(4&9&14&19&24&5&10&15&20&25)

4 × 1 (p)(one block) is expanded to 1 × 3 block.

1 × 3 block expansion

FIG. 14 region determination

| result of blank space separation | result of edge separation | result of region determination |
|---|---|---|
| blank space (WD = 1) | edge (ED = 1) | character region (RMS = 0) |
| | non-edge (ED = 0) | pattern region (RMS = 1) |
| non-blank space (WD = 0) | | |

FIG. 15 pixel selection

| processing mode | setting (command) | | output signal (SKD) | |
|---|---|---|---|---|
| | MOJ | PIC | RMS = 0 | RMS = 1 |
| pencil mode | 0 | 0 | EDG[7:0] | EDG[7:0] |
| automatic mode | 1 | 1 | EDG[7:0] | SDG[7:0] |
| photograph mode | 0 | 1 | SDG[7:0] | SDG[7:0] |

EDG: MTF correction signal
SDG: smoothing processing signal without the size being changed compressed enlarged γ-convertion curve for documents/copy original image pixel block

FIG. 30

```
P1=(Lmax+3Lmin)/4
P2=(3Lmax+Lmin)/4
Q1=mean of all xij such than xij ≤ P1
Q4=mean of all xij such than xij > P2
LA=(Q1+Q4)/2
LD=Q4-Q1
L1=LA-LD/4
L2=LA+LD/4
for(i=0,....3)
    for(i=0,....3)
        if xij ≤ L1         φij=01(binary)
        eles if xij ≤ LA    φij=00(binary)
        eles if xij ≤ L2    φij=10(binary)
        eles                φij=11(binary)
        end_if
    end_for
end_for
``` coded algorithm

```
for(i=0,....3)
    for(i=0,....3)
        if φ ij=01         yij=LA-LD/2
        eles if φij=00     yij=LA-LD/6
        eles if φij=10     yij=LA+LD/6
        eles               yij=LA+LD/2
        end_if
    end_for
end_for
``` decoded algorithm

FIG. 31

1 bite X 16 = 16 bites ⟶ φij (2 bit X 16) + La(1 bite) + Ld(1 bite) = 6 bites before coded            after coded

FIG.35A
あいうえお
かきくけこ
さしすせそ
たちつてと
FIG.35B
あいうえお
かきくけこ
さしすせそ
たちつてと
FIG.36A
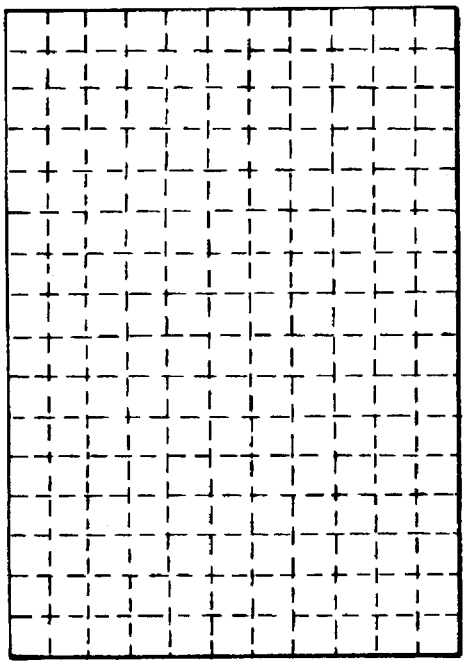
FIG.36B
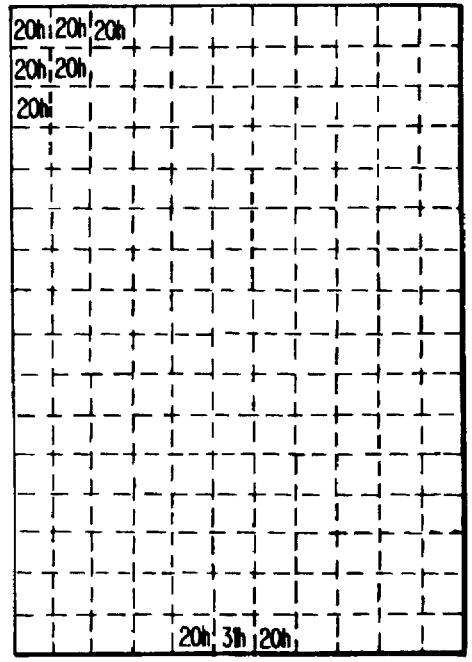

FREELY CONFIGURABLE IMAGE PROCESSING APPARATUS

FIELD OF THE INVENTION

The present invention relates to an image processing apparatus having a digital image processing function such as an image processing apparatus applied, for instance, to a digital copying machine, a facsimile device, a printer or the like, and especially to an image processing apparatus in which a sequence for processing an image can freely be set, and also to an image processing apparatus in which an image path can freely be set.

BACKGROUND OF THE INVENTION

In the conventional digital image processing apparatus, one image processing function is generally realized with a single image path. Namely, a sequence for processing an image is previously decided, and the image is processed according to this sequence.

In contrast, an image processing apparatus constructed so that an image processing is performed by changing a sequence of filter processing and processing for changing an image size has been disclosed in Japanese Patent Laid-Open Publication No. 207272/1993. As for a sequence of filter processing and image size changing, if image size changing is performed after processing with a filter, an efficiency of the filter (matrix size) can effectively be utilized for enlarging the image, but a filter having a large matrix size can not effectively be used for compressing the image. Also, if processing with a filter is executed after a size of an image is changed, the filter efficiency can effectively be used when compressing the image, but the filter with a large matrix size can not effectively be used for enlarging the image. For this reason, in the technology disclosed in Japanese Patent Laid-Open Publication No. 207272/1993, there is provided a control means for changing a sequence of processing with a filter processing means and processing with an image size changing means according to the magnification.

As described above, in the examples based on the prior art, a sequence of processing with a filter and processing for changing a size of an image can be changed according to the magnification. However, the image processing apparatus in each of the cases is equipped with various types of image processing section. The image processing sections include, for instance, a scanner section, a shading section, a filter section, an image size changing section, a γ converting section, a tone processing section, an editorial section, a storage section, an external interface section, a printing section, plot section or the like, and a processing sequence is set to an optimal one according to contents of the processing. Generally, this processing sequence is fixed, and in some cases the sequence of processing with a filter and processing for changing a size of an image can be changed, but the processing sequence and times of processing in the processing section can not always be changed freely.

In addition, so long as the sequence of each processing step is fixed, concurrent processing by each section such as, for instance, that enabled by making a storage section independent from an external interface for concurrent processing by them, is impossible.

SUMMARY OF THE INVENTION

It is an object of the present invention to provide an image processing apparatus in which a processing sequence and times of processing in the processing section can freely be changed.

Also, it is an object of the present invention to provide an image processing apparatus in which optimal image processing can be executed to an inputted image by making it possible to freely change a sequence of steps for image processing. Furthermore it is an object of the present invention to provide an image processing apparatus in which various types of image processing can be executed according to one type of image processing configuration by making it possible to freely change a sequence of steps for image processing.

Furthermore, it is another object of the present invention to provide an image processing apparatus in which an access to the storage section and I/O control for the external interface section are executed independently from various types of image processing function for allowing easy interface with other image processing apparatuses and resources for each image processing device can effectively be utilized.

With the present invention, image processing can be executed according to an arbitrary processing sequence other than that specified by a control means. With this feature, optimal image processing can be executed to an inputted image. Also, various types of image processing can be executed with one type of image processing configuration.

With the present invention, a processing sequence can freely and easily be changed by changing a sequence of selection by an input selector and that by an output selector.

With the present invention, processing by the image size changing section is executed twice, so that a size of an image can be changed in both the main scanning direction and auxiliary scanning direction by rotating the image in the storage section.

With the present invention, processing by the printing section is executed twice, so that letters in different directions can be printed at different places by rotating the image in the storage section.

With the present invention, processing in the filter section is executed twice, so that an image is processed by different filters and the filter characteristics better than that previously specified can be achieved.

With the present invention, image size changing is executed twice in the image size changing section, so that an image size can be changed better the than magnification specified in the image size changing section.

With the present invention, editing is executed twice in the editorial section, so that editing can be executed better than a degree previously set in the editorial section.

With the present invention, tone processing is executed prior to processing in the storage section, so that a screen angle can be changed.

With the present invention, tone processing is executed after image data subjected to editorial processing and printing processing is stored once in the storage section, so that any collapse never occurs in image data after memory compression nor in phase data.

With the present invention, tone processing is executed after data subjected to conversion is once stored in the storage section, so that any collapse never occurs in image data after memory compression nor in phase data.

With the present invention, image data from an external device is outputted via the tone processing section by making use of an external interface, so that the external device can access the tone processing function.

With the present invention, image data from an external device is outputted via the filter section, image size changing section, γ converting section, editorial section, printing section, storage section and tone processing section by making use of an external interface, so that the external device can access the filter section, image size changing section, γ converting section, editorial section, printing section, storage section, and tone processing section.

With the present invention, output data from the printing section passes through the editorial section and storage section, so that the image data can be modified after letters are synthesized.

With the present invention, image data from the internal interface section passes through the storage section, so that image data in an external device can electronically be sorted.

With the present invention, an image signal inputted in a second video bus from an internal image processing section can freely be sent to any of an external storage section, an external interface, and an output section, and in addition an image path to the external storage section, external interface, or output section can freely be selected, and with this feature resources for read and write in an image processing apparatus can effectively be utilized.

With the present invention, an image data, a control signal, and a clock can be selected as a block necessary for to an interface with other image processing device, and with this feature an image processing can concurrently be executed with other image processing device.

With the present invention, an external unit for input and an external unit for output can be connected to each other independently, and with this feature data transfer between two external units can be controlled independently from a processing function inside the image processing device.

Other objects and features of this invention will become understood from the following description with reference to the accompanying drawings.

BRIEF DESCRIPTION OF THE DRAWINGS

FIGS. 7A to 7E are explanatory views showing filter coefficient in the MTF correcting section in FIG. 6;

FIGS. 8A to 8H are explanatory views showing a filter coefficient in the smoothing processing section shown in FIG. 3;

FIG. 9 is an explanatory view showing a filter coefficient in the Laplacian processing section in FIG. 3;

FIG. 10 is an explanatory view showing a processing in the edge separating block shown in FIG. 3;

FIG. 11 is an explanatory view showing a pattern for detection in the blank candidate detecting section in FIG. 3;

FIG. 14 is an explanatory view showing a processing in the region discriminating section in FIG.

FIG. 15 is an explanatory view showing a processing in the pixel selecting section in FIG. 3;

FIG. 30 is an explanatory view showing an algorithm of a GBTC fixed-length coding system;

FIG. 31 is an explanatory view showing a data volume before and after image compression;

FIGS. 35A and 35B are explanatory views showing a synthesizing processing in the synthesizing section in FIG. 34;

FIGS. 36A and 36B are explanatory views showing character data stored in the text RAM in FIG. 4;

DESCRIPTION OF THE PREFERRED EMBODIMENTS

Next, a detailed description is made hereinafter for embodiments of the present invention with reference to the related drawings.

Figure 1:
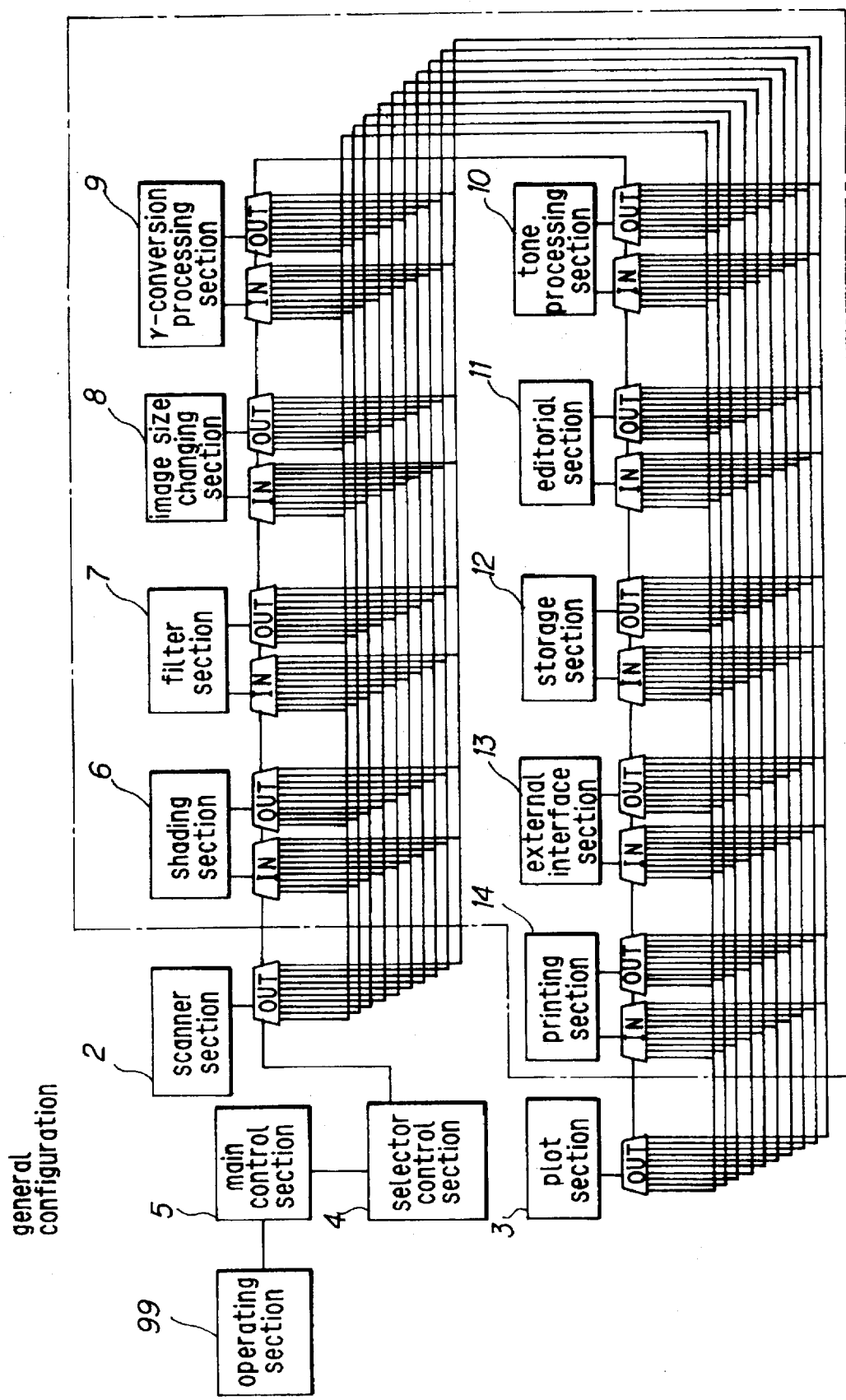
FIG. 1 is a block diagram showing general configuration of an image processing device according to Embodiment 1 of the present invention.

At first, a digital copying machine according to Embodiment 1 of the present invention comprises, as shown in FIG. 1, an image processing section 1, a scanner section 2, a plot section 3, a selector control section 4, and a main control section 5, and the image processing section 1 comprises a shading section 6, a filter section 7, a image size changing section 8, a γ-conversion section 9, a tone processing section 10, an editorial section 11, a storage section 12, and an external interface section 13, and a printing section 14, and a specified processing is executed in each processing block.

<Shading Section>

In order to prevent output from becoming dispersed due to non-uniform illumination or non-uniform sensitivity for each pixel in an CCD even though a document with homogeneous density is read, the shading (correcting) section 6 reads a white reference with homogeneous density before scanning a document, stores the data for each pixel, and corrects an output value for each pixel with reference to the stored data when the document is scanned.

<Filter>

Figure 2:
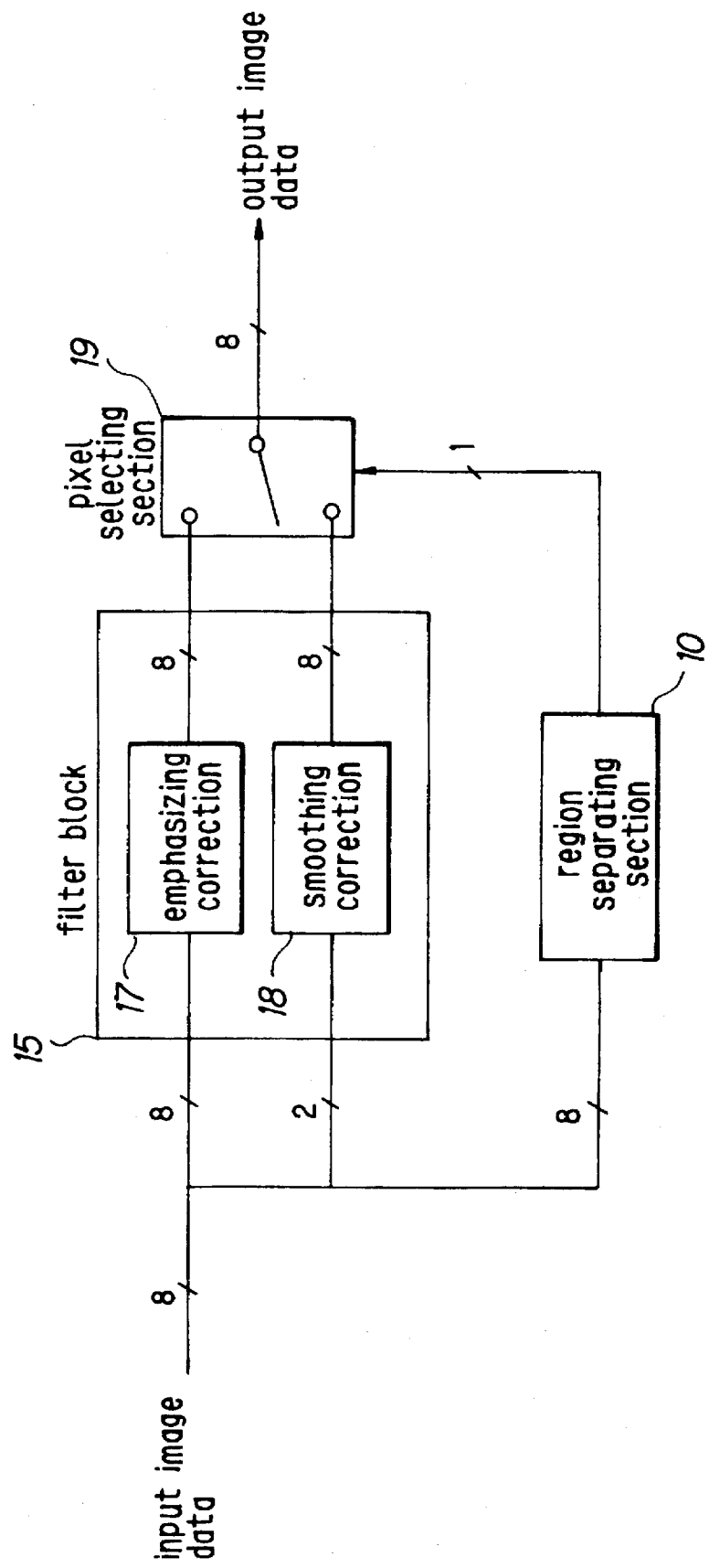
FIG. 2 is a block diagram showing configuration of a filter section in the image processing device shown in FIG. 1.

In the filter (processing) section 7 shown in FIG. 2, correction for emphasizing, correction for smoothing, and region separation are executed, and input image data to the filter section 7 is, as shown also in FIG. 2, composed of 8 bits. This image data is inputted to both a filter block 15 and a region separating block 16. In the filter block 15, correction for emphasizing and that for smoothing are executed in an emphasizing correction section 17 and the smoothing correction section 18 respectively. Namely, in the emphasizing correction section 17, pixels to be emphasized are processed by an emphasizing filter, and in the smoothing correction section 18, a filter having flat characteristics is used. In the region separating block 16, image data is divided to that for regions requiring emphasizing and that for regions requiring smoothing, and the result is outputted in a pixel selecting section 19. In the pixel selecting section 19, a filter is selected from each pixel and image data is outputted according to information inputted from the region separating block 16.

Figure 3:
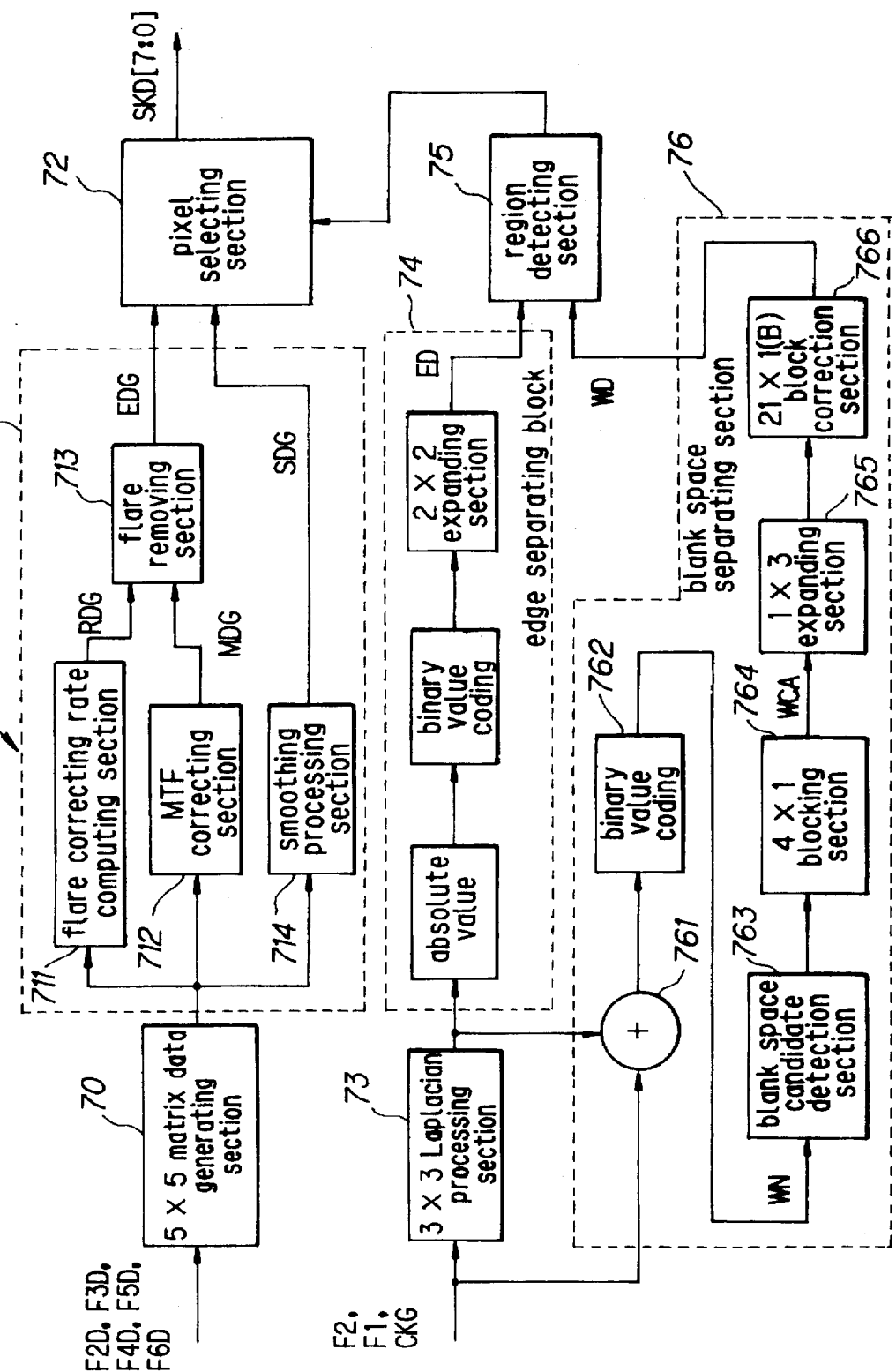
FIG. 3 is an explanatory view showing contents of a processing in the filter section shown in FIG. 2.
Figure 4:
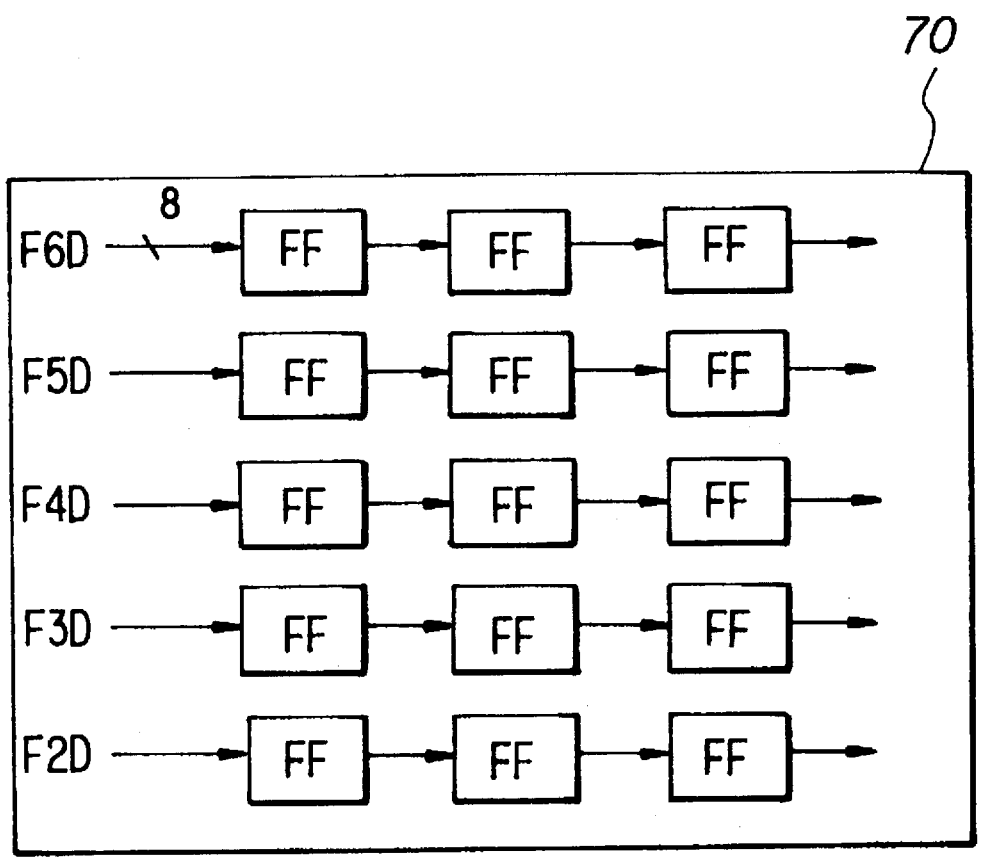
FIG. 4 is a block diagram showing details of a 5×5 matrix data generating section in FIG. 3.

Contents in the filter section 7 is shown in FIG. 3. At first, image data CKD [7:0] from the shading section 1 shown in FIG. 1 is subjected to γ-conversion by a scanner and is converted to image data CKG [7:0], and furthermore this image data CKG [7:0] is delayed by 1 to 6 lines in the auxiliary scanning direction to generate image data F1, F2 and F2D to F6D, which are inputted to the filter section 3 shown in FIG. 3.

When the signals 2D to F6D generated by delaying image data CKG [7:0] by 2 to 6 lines in the auxiliary scanning direction and 55 pixels in the main scanning direction are inputted into a 5×5 matrix data generating section 70, the 5×5 matrix data generating section 70 generates 5×5 matrix data from this input data and outputs the 5×5 matrix data to a filter block 71. It should be noted that this 5×5 matrix data is actually 3×5 matrix data because a filter coefficient is symmetric.

Figure 5:
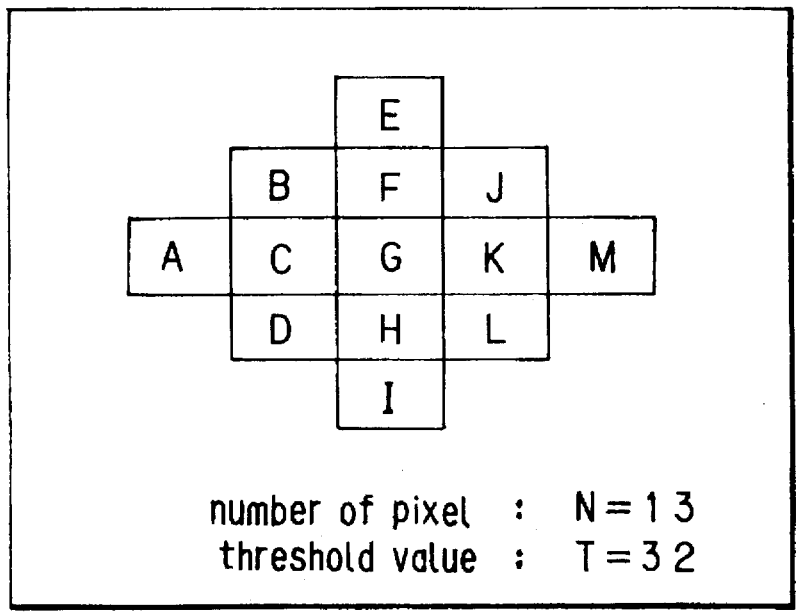
FIG. 5 is an explanatory view showing details of a flare correction rate computing section in FIG. 3.
Figure 6:
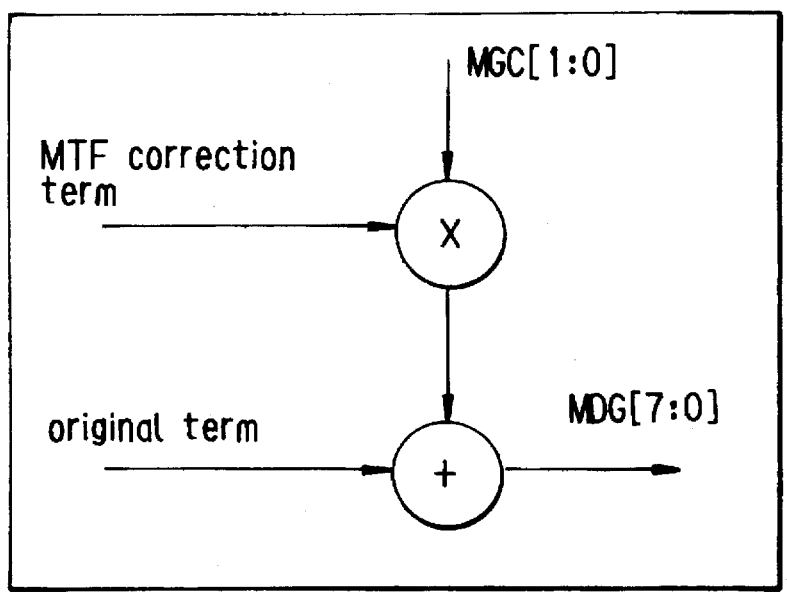
FIG. 6 is an explanatory view showing details of an MTF correcting section in FIG. 3.

A flare correcting rate computing section 711 within the filter block 71 computes a level of pixels each having a value less than a value T within a 5×5 pixel region as shown in FIG. 5, obtains a average by dividing the 5×5 pixel region by the number of pixel N, and defines the value as a flare correction rate RDG [7:0] for pixels G to be emphasized. An MTF correcting section 712 divides a filter coefficient to an MTF correction term and an original term, multiplies the MTF correction term by magnification expressed by MGC [1:0], as shown in FIG. 6, for a pixel to be emphasized located at a center of the 5×5 pixel region, and adds a result of the multiplication to the original term (=MDG [7:0]). This filter coefficient for MTF correction is composed, for instance, as shown in FIGS. 7A to 7E.

A flare removing section 713 removes flare in the character mode by subtracting a flare correction rate RDG from an MTF correction rate MDG as shown by the following expression:

$$EDG\ [7:0] = MDG\ [7:0] - RDG\ [7:0]$$

and in the pencil mode, does not execute flare removal as shown by the following expression:

$$EDG\ [7:0] = MDG\ [7:0]$$

A smoothing processing section 714 executes a processing for fainting and emphasizing, for instance, as shown in FIGS. 8A to 8H, as well as a processing for smoothing using a filter having flat characteristics in a particular frequency area. A result, SDG of this processing for smoothing and an output EDG from the flare removing section 713 are selected by an pixel selecting section 72 and outputted as a signal SKD [7:0] subjected to a filter processing.

Image data CKG [7:0] subjected to γ-conversion by a scanner and data F1 [7:0] and F2 [7:0] generated by delaying the CKG [7:0] by 1 and 2 lines in the auxiliary scanning direction respectively are inputted into a 3×3 Laplacian processing section 73, which outputs 11-bit data with a sign with a Laplacian filter having a coefficient as shown in FIG. 9.

An edge separating block 74 converts an absolute value of the output with a sign from the 3×3 Laplacian processing section 73 to binary value data, extracts edge candidates, decides edge pixels ED by means of 2×2 expansion processing as shown in FIG. 10, and outputs the edge pixels to a region determining section 75. It should be noted that the edge pixels decided by means of expansion processing is not used as expansion data for next edge separation, and a pixel to be emphasized in the expansion processing is shown at the bottom right in FIG. 10. In the processing for conversion to binary value data, values not less than a threshold value TFE [7:0] are regarded as candidates for edge.

A blank space separating block 76 at first adds an output from the Laplacian processing section 73 to the original data prior to conversion to binary value data and executes MTF correction. Outline of an algorithm for blank space separation is described below.

Figure 12:
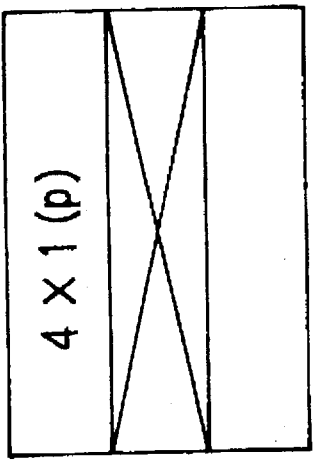
FIG. 12 is an explanatory view showing as processing in a blocking section as well as in an expanding section shown in FIG. 3.
Figure 13:
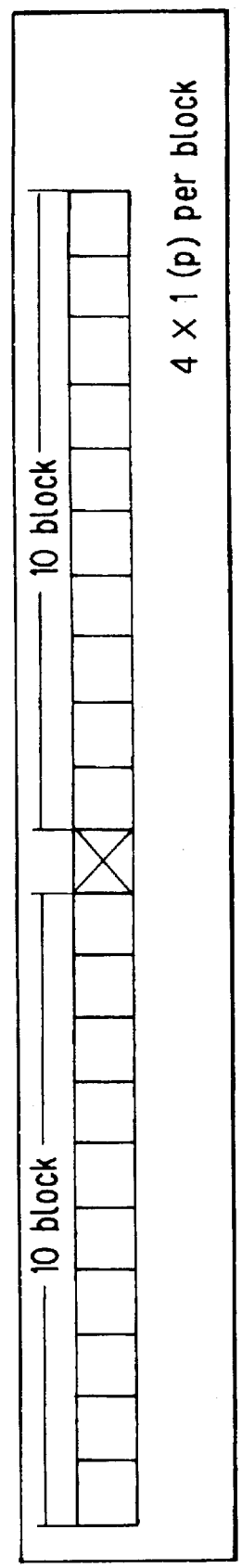
FIG. 13 is an explanatory view showing a processing in the block correcting section in FIG. 3.

At first in an MTF correcting section 761, original data is subjected to MTF correction. In this case, amplitude of the correction term is changed with Laplacian output multiplied by SLAP [2:0] times, and the product is added to the original data. In a binary value coding section 762, pixels with the corrected output closer to the white side than the threshold value TFW [7:0] (smaller than TFW) are detected as white pixels. In a blank space candidate detecting section 763, 5×5 pattern matching is executed as shown in FIG. 11, and patterns comprising 2×5 or 5×2 regions each consisting of only white pixels are detected. In a blocking section 764 as well as in an expanding section 765, blocking is executed by using 4×1 pixels as a unit as shown in FIG. 12, and when 1 or more pixels for white are present in a block, a remarking block is regarded as a white block, and the block is expanded by 1 block upward and downward in the auxiliary scanning direction. In a block correcting section 766, when at least 1 or more blank blocks are present in 21×1 blocks (1 block consisting of 4×1 pixels) as shown in FIG. 13, a remarking block at the center is regarded as a blank block (=MD). The region determining section 75 discriminates a character region from a pattern region according to a result of edge separation ED and a result of blank space separation as shown in FIG. 14. The pixel selecting section 72 selects an MTF correction signal EDG or a smoothing processing signal SDG from the filter block 71 by determining whether a current operating mode is the pencil mode, automatic mode, or photograph mode, and also according to a determining signal RES from the region determining section 75.

<Image Size Changing Section>

In the image size changing section 8, image size changing in the main scanning direction in a range from 25 to 512% (by a step of 1%) is executed by means of interpolation based on a cubic functional convolution method. Selection of expansion or compression is executed according to a signal kakdi, and control over actual operations for image size changing is executed according to image size changing control data written in a 512×4 bit internal RAM. In addition to operations for image size changing, an image shift in the main scanning direction can be executed in this section.

Figure 16:
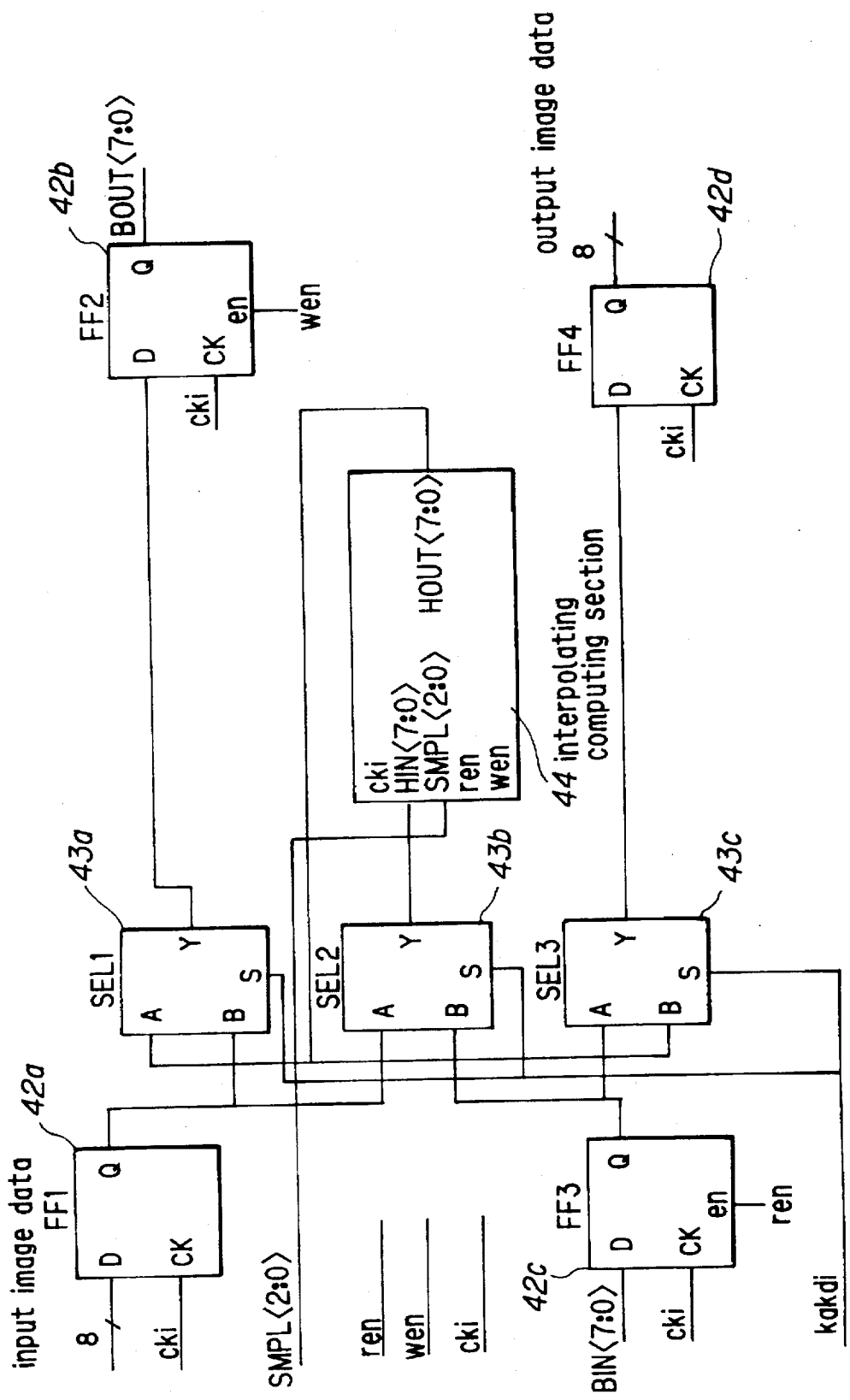
FIG. 16 is a block diagram showing details of an image size changing section in the image processing device in FIG. 1.

FIG. 16 is a block diagram showing the image size changing section 8. The image size changing section 8 comprises 4 flip-flops (FF) 42a, 42b, 42c, 42d, 3 selectors (SEL) 43a, 43b, 43c, and an interpolation computing section 44. Input image data consists of 8 bits, and also output image data consists of 8 bits. BOUT <7:0> outputted from the terminal Q from FF2 (42b) is output data to FIFO, BIN <7:0> inputted to the terminal D of FF3 (42c) is input data from FIFO, and SMPL <2:0> indicates re-sampling positional data from the internal RAM. FF1 (42a) and FF4 (42d) are flip-flops each with an en-terminal, while FF2 (42b) and FF3 (42c) are ordinary 8-bit flip-flops.

Figure 17:
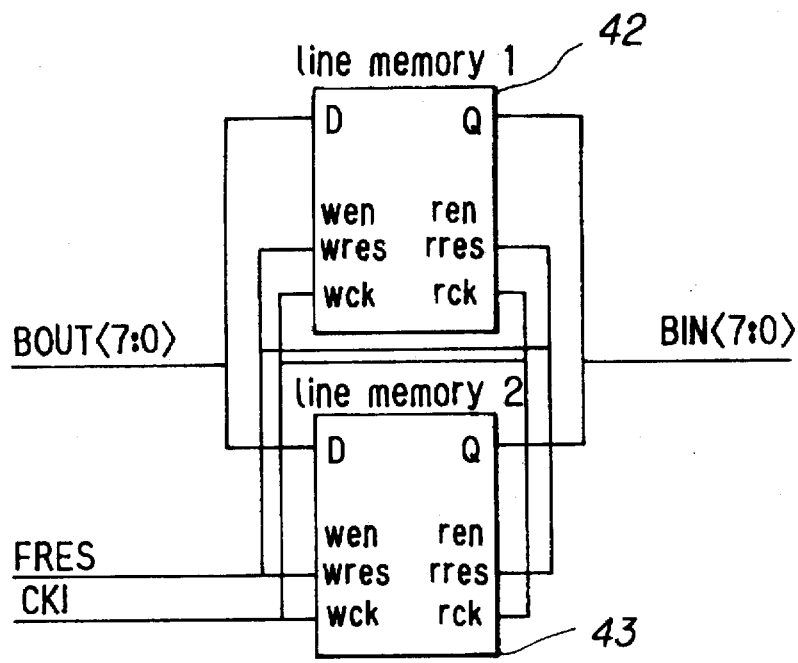
FIG. 17 is a block diagram showing a line memory in the image size changing section in FIG. 16.
Figure 18:
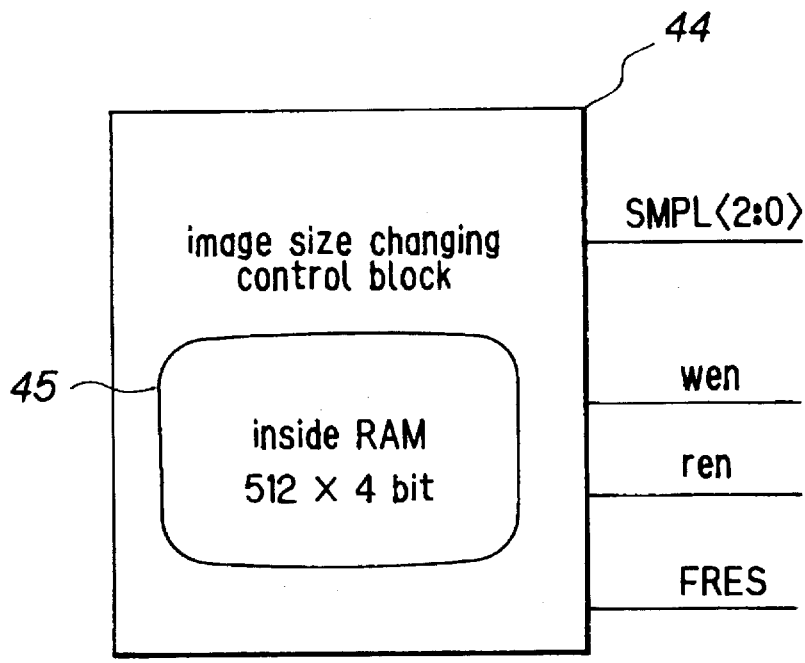
FIG. 18 is a block diagram showing a image size changing control block in the image size changing section in FIG. 16.

SEL 1 to 3 (43a, 43b, 43c) are 8-bit selectors. The interpolation computing block 44 indicates an 8-bit multi-valued data interpolation computing circuit. Two 5k×8 bit incorporated line memories 42, 43 are connected in parallel to BOUT and BIN respectively as shown in FIG. 17 to provide toggle operation for each line. H/L control for ren and wen are provided according to image size changing control data stored in the RAM 45 inside the image size changing control block 44 as shown in FIG. 18.

Then description is made for operations for copying an image without changing the original size, compressing or enlarging an image.

Figure 19:
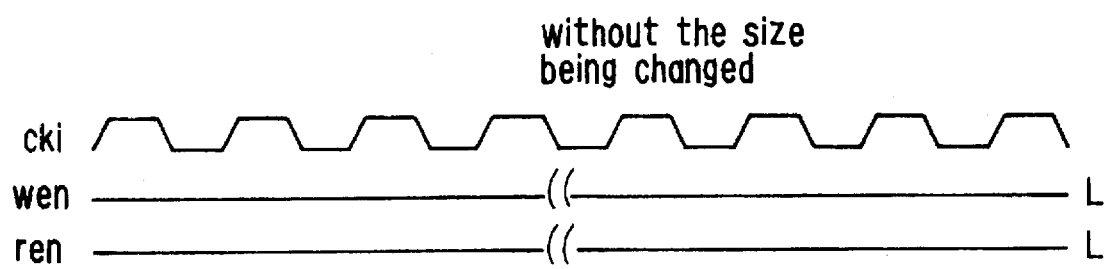
FIG. 19 is a timing chart showing a main signal when changing a size of an image.

As shown in FIG. 19, when an image is copied without the size being changed, kakdi is equal to L, and input data is fetched by FF1 (42a) and is written via the interpolation computing block 44 from BOUT into FIFO. This data is read in the next line and is outputted via FF3 and FF4 from BIN as output image data. Then wen and ren are equal to L as shown in the next figure, and speed change is not changed with the image copied without the size being changed.

Figure 20:
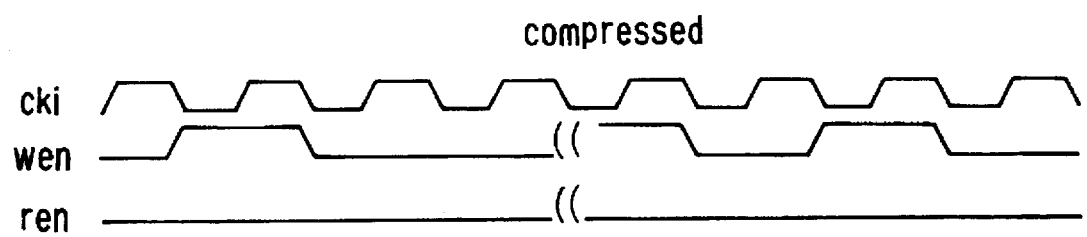
FIG. 20 is a timing chart showing a main signal when reducing a size of an image.

As shown in FIG. 20, as kakdi is equal to L (kakdi=L) when an image is compressed, input image data is fetched by the FF1 (42a) and is sent to the interpolation computing block 44, where the data is interpolated by means of the cubic functional convolution method. A sampling position when interpolation is executed is obtained by reading image size changing control data previously written in the RAM 45. The interpolated data is thinned by wen control in the FF2 (42b) and is written from the BOUT <7:0> into FIFO. The written data is read out at a constant speed in which REN is equal to L (REN=L) from the BIN <7:0>, and is outputted via the FF3 (42c) and FF4 (42d) as output image data.

Figure 21:
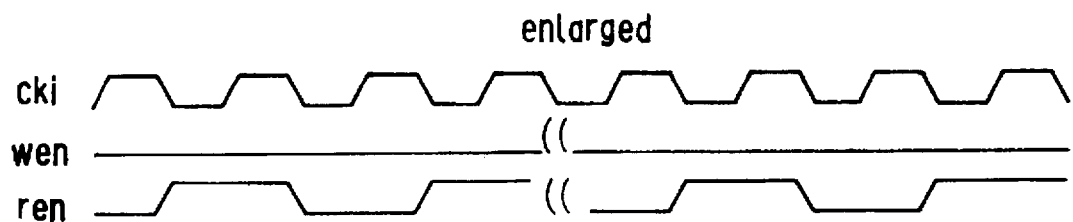
FIG. 21 is a timing chart showing a main signal when enlarging a size of an image.

As shown in FIG. 21, as kakdi is equal to H (kakdi=H) when an image is enlarged, input image data is fetched by the FF1 (42a), and also as wen is equal to L (wen=L), the input image data is written at a constant speed from BOUT <7:0> via the FF2 (42b) into FIFO, and in the next line the data is read out from the BIN <7:0>. In this step read is controlled by controlling the ren signal with a reading speed changed. The BOUT <7:0> is sent to the interpolation computing block 44, where interpolation is executed by means of the cubic functional convolution method. Sampling position data when interpolation is executed can be obtained by reading data stored in the RAM 45. A processing for expansion is executed by changing the sampling position to data reading of which is once stopped and executing interpolation several times. The interpolated data is outputted via the FF4 (42d). <γ-Conversion Section>

In the γ-conversion section 9, darkness characteristics of copy output to be obtained is decided by selecting any of darkness keys (1 to 7) on the operator panel according to darkness of a document, and image data is functionally converted to realize the selected darkness. This γ-conversion section 9 has a function for matching input characteristics of an image scanner to output characteristics of a printer section and a function for changing darkness of an image according to a darkness key.

Figure 22:
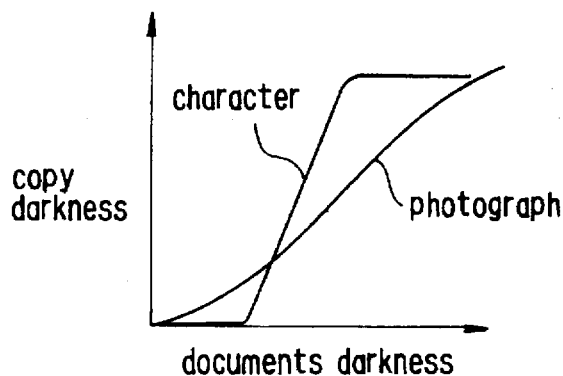
FIG. 22 is an explanatory view showing a conversion curve in a γ-conversion table for a document/copy in the γ-conversion section in FIG. 1.
Figure 23:
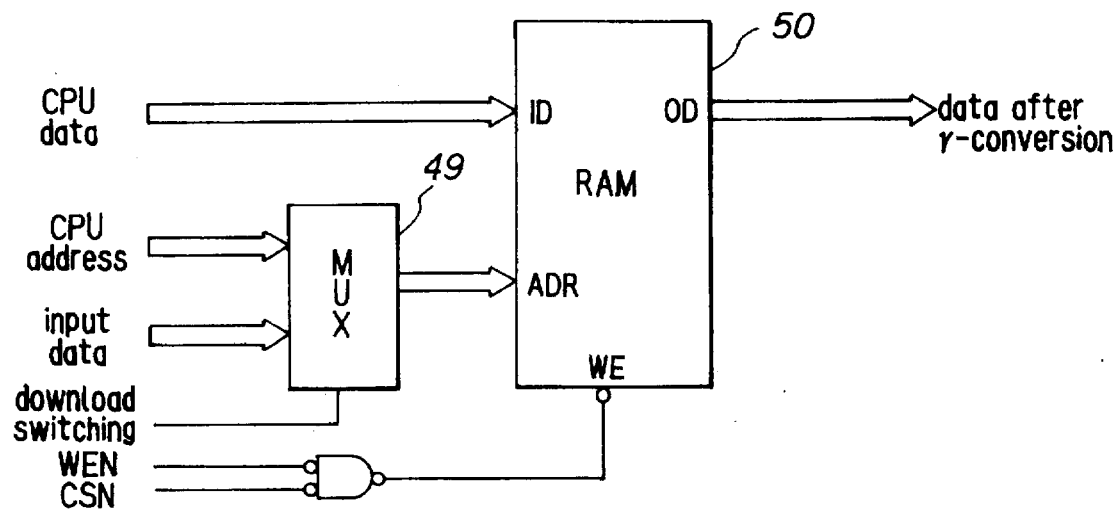
FIG. 23 is a block diagram showing a key section of the γ-conversion section in FIG. 1.

In this case, if the documents consist of characters, as a space other than the characters is a blank space, it is important to uniformly emphasize the character sections. In case of a photograph document, it is important to reproduce the photograph with various types of tone. For that purpose, taking into consideration characteristics of and a photograph as described above, relation between darkness of a document and that of its copy is as shown by a curve shown in FIG. 22. FIG. 23 is a block diagram showing the γ-conversion section 9. This γ-conversion section 9 operates according to a type of documents in any of the following 4 operating modes; character mode, photograph mode, character/ photograph mode, and pencil mode, and various types of data for a document or a copy each corresponding to any of notch set values (from 1 to 7) are generated and stored in the ROM. When copying a document, when a mode and a notch set value are selected, data is downloaded previously to addresses 0 to 255 in the internal RAM (288 bytes) 50 via a multiplexer 49 according to the selected mode and notch set value, and during the normal operation an input image is regarded as addresses in the RAM 50, and data outputted to the addresses is taken out as data subjected to γ-conversion.

<Tone Processing Section>

Figures 24, 25:
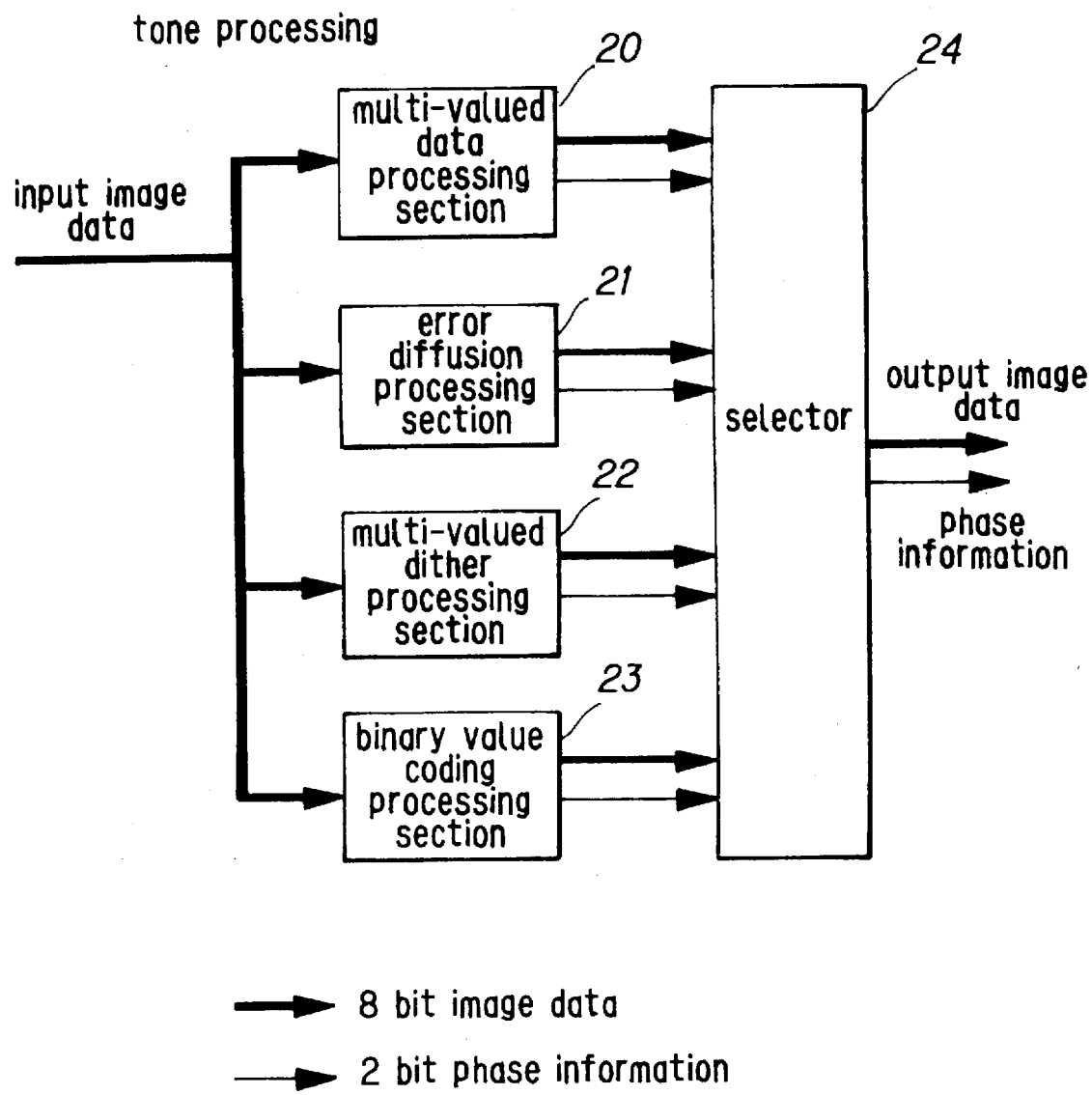
FIG. 24 is a block diagram showing details of the tone processing section in FIG. 1.
FIG. 25 is an explanatory view showing an error diffusion processing in FIG. 24.
Figure 26:
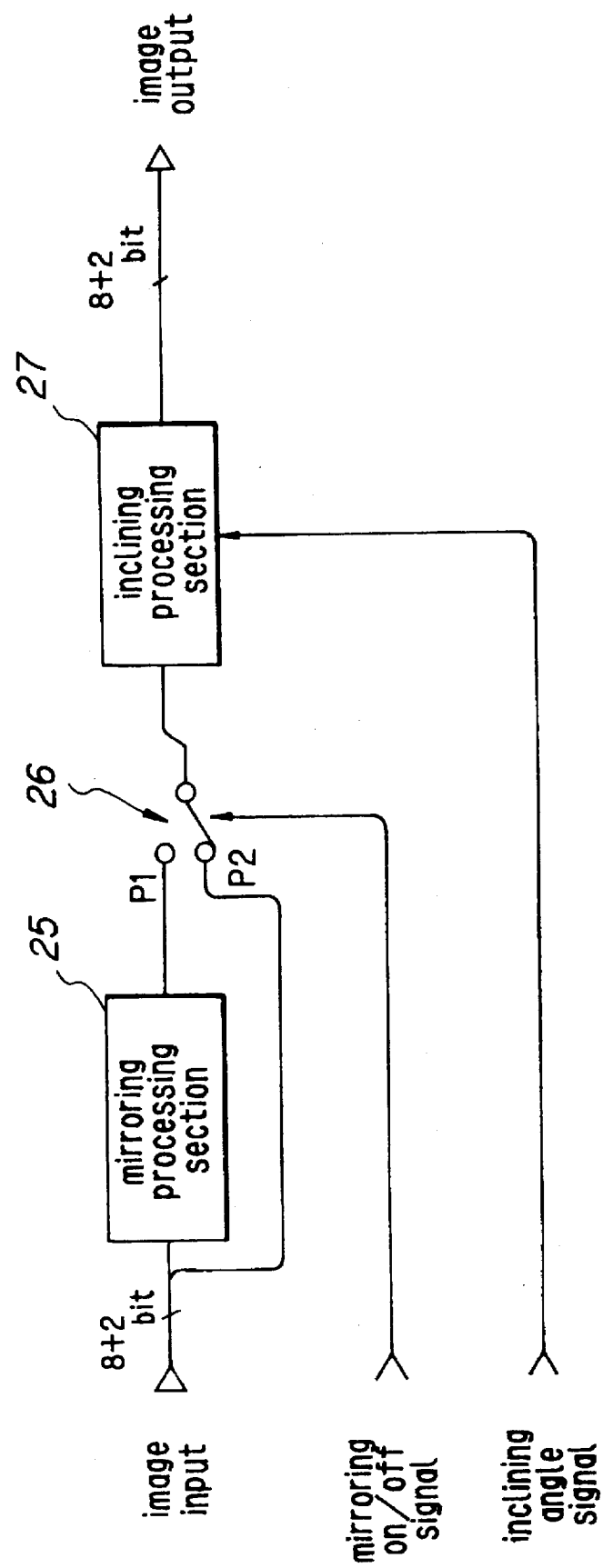
FIG. 26 is a block diagram showing details of the editorial section in FIG. 1.

Configuration of the tone processing section 10 is as shown by a block diagram in FIG. 24. Namely, the tone processing section 10 comprises a multi-valued data processing section 20, an error diffusion processing section 21, a multi-valued dither processing section 22, and a binary value coding processing section 23, and any of the processing is selected by the selector 24. In the multi-valued data processing section 20, image data itself is not processed, and phase of pixels to be processed is decided taking into considerations a size relation between adjacent pixels. In this step, a darkness level of a pixel in the left side is compared to that of a pixel in the right side, and if the two levels are identical, phase of the object pixels is regarded as a central phase, and if the two levels are not identical, the phase is aligned to a darker one.

The error diffusion processing executed in the error diffusion processing section 21 is a processing for removal of moire, in which a quantized error is distributed to adjacent pixels to minimize the error as a whole. As for a level of quantization in this embodiment, a signal once quantized to 8 bits (256 values) is quantized again to 9-valued or binary data in the error diffusion section, and the error in quantization is distributed according to the distribution ratio as shown in FIG. 25.

A processing executed in the multi-valued dither processing section 22 is a processing for expressing an intermediate tone, whereby an intermediate tone level is expressed using a plurality of pixels as a unit with an area ratio of the black pixels in the unit. In this step, if there are 4 types of tone in printer output for a pixel, by combining the intermediate tone level with any of the 4 available printer output tones above, a unit for tone expression can be made smaller, which allows more abundant expression of tone with maintaining the resolution. Namely, if there are 16 types of printer output tone for one pixel, 256 types of tone expression become possible because a unit for tone expression consists of 4×4 pixels (namely 16 pixels×16 types of tone expression/pixel= 256 types of tone expression). In the multi-valued dither processing, a method of requantization varies according to a position within a unit (4×4 pixels), and also the phase changes according to the position.

As an image signal may be treated as two values/pixel in such applications as a facsimile machine, a binary value coding processing section 23 is provided for binary coding.

A selector section 24 selects an output from an 8-bit image signal and a 2-bit phase signal outputted from any of a multi-valued coding section 20, an error diffusion processing section 21, a multi-valued dither processing section 22, and a binary coding processing section 23 according to a character mode, a character/photograph mode, a photograph mode, or an image mode such as facsimile transmission mode specified on the operating panel.

The correspondence is, for instance, as shown below.

Character mode—Multi-valued coding processing
Character/photograph mode—Error diffusion processing
Photograph mode—Multi-valued dither processing
FAX code—Binary value coding processing <Editorial Section>

In the editorial section 11, the following operations are executed. Namely, an input image signal to the editorial section 11 is a 10-bit signal as shown in FIG. 16, and, and of these 10 bits 8 bits is tone data and can express 256 types of tone. The remaining 2 bits indicate phase data.

In this editorial section 11, at first an image is converted to a mirror image in a mirroring processing section 25. In actual operation, an image signal is written for each line in a line memory, and when reading out the written memory a write address and a read address in the line memory are controlled, so that the image data is read out in an order of addresses reverse to that in which the image data is written in the line memory. This operation is disclosed in, for instance, Japanese Patent Laid-Open Publication No. 268, 458/1993 disclosing the "Image data converting method and apparatus", and is well known, so that detailed description thereof is omitted herein.

The mirroring operation is executed not only for tone data, but also for phase data, so that the following capacity is required:

(A number of pixels in 1 line)×(10 bits)

Figure 27A:
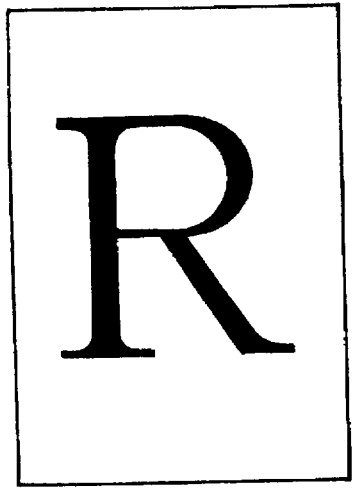
FIGS. 27A and 27B are explanatory views showing a mirroring processing in the editorial section in FIG. 26.
Figure 27B:
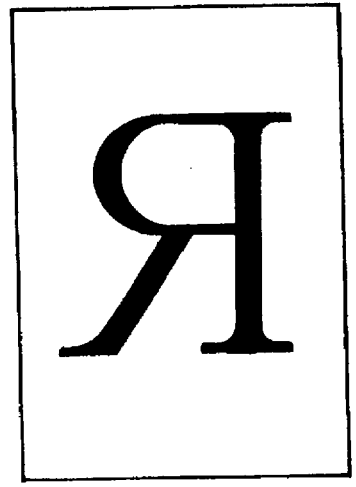

It should be noted that, as for the phase data, not only mirroring is executed, but also the phase itself must be converted. An image is reversed in the right and left direction by means of mirroring, so that an image in the left phase is converted to that in the right phase, and an image in the right phase is converted to that in the left phase. It is not necessary to convert an image in the middle phase. FIGS. 27A and 27B show examples of execution of the mirroring processing, and the document image shown in FIG. 27A is mirrored to that shown in FIG. 27B.

Selection of a mirroring processing is made through operation of a switch 26 for signal selection, and either an image mirrored in the mirroring processing section 25 according to an instruction from a control section or an image not passing this section and not mirrored is selected, and the selected image is outputted to a subsequent step. Selection with the switch 26 is made according to an mirroring ON/OFF signal. Namely, when the mirroring ON/OFF signal is ON, the switch falls to the position P1 to select a mirrored image, and when the mirroring ON/OFF signal is OFF, the switch falls to the position P2, and an image not mirrored is selected.

Provided in a stage subsequent to this switch 26 is an inclining processing section 27, which can incline (or distort) the image. In actual operation, when writing in or reading an image signal for each line from a line memory, image data can be read from different addresses from those at which the image data was actually written in the line memory. This operation is disclosed, for instance, in Japanese Patent Laid Open Publication No. 63-199568 disclosing the "Image Processing Apparatus", and for this reason detailed description thereof is omitted herein.

Figure 28A:
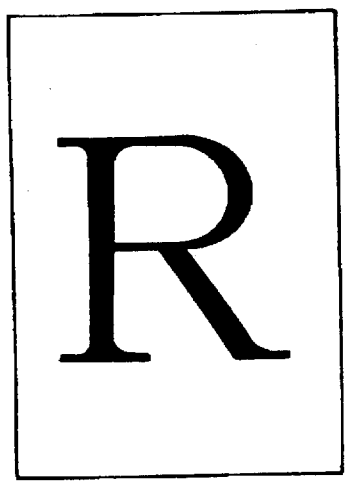
FIGS. 28A and 28B are explanatory views showing a processing for inclining letters in the editorial section in FIG. 26.
Figure 28B:
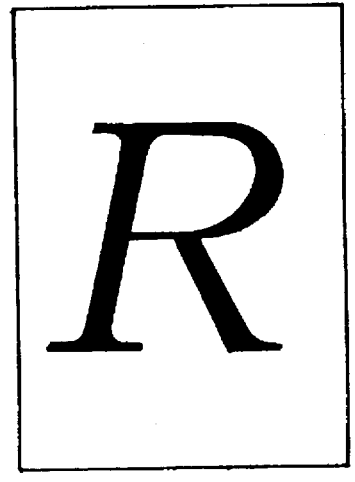

An operation for inclination is executed not only for tone data, but also for phase data, so that the following capacity is required for the line memory:

(A number of pixels in 1 line×10 bits) In some types of memory, 2 units of line memory may be required like in case of the embodiment disclosed in the document cited above. FIGS. 28A and 28B show examples of a processing for inclination, and the document image shown in FIG. 28A is inclined as shown in FIG. 28B. An angle for this inclination is set according to an inclination angle signal from the control section, and the inclination processing section 27 executes an operation for inclination according to this inclination angle signal.

<Storage Section>

The storage section 12 has a large capacity memory and realizes such functions as an electronic sorter, retention (a multiple number of copies prepared by scanning one time), and image rotation by having image data stored in a memory. Next, a description is made for a method of compressing an image, internal configuration of the storage section, and main functions for application.

Figure 29:
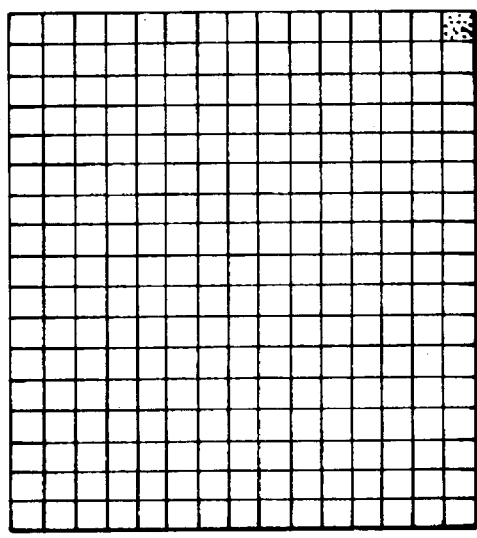
FIG. 29 is an explanatory view showing an image compression system for storing in the storage section in FIG. 1.

In the storage section 12, image compression is executed. As a method of compressing an image, the GBTC fixed length coding system is used. In the GBTC fixed length coding system, as shown in FIG. 29, an image is disassembled to blocks, and a darkness value $Lij$ for 1 byte in one block is compressed to a data volume through the algorithm shown in FIG. 30 to an average value $La$ (1 byte), a tone width index $Ld$ (1 byte), and a sign $\phi ij$ (2 bits×16) for each pixel. With this coding system, as shown in FIG. 31, 16 bytes, a data volume for a 4×4 pixel block which corresponds to 1 byte of pixels as shown in FIG. 31, can be compressed to 6 bytes; namely the data volume can be reduced to ⅜. Although there is phase data (2 bits) in addition to image data, the phase data is not compressed as shown in FIG. 32, and is set to a memory 48 not via an compressing section 29.

To describe the above step more clearly, the following expression is effective:

1 byte×16=16 bytes (before coding)→$\phi ij$ (2 bits×16)+$La$ (1 byte)+ $Ld$ (1 byte)=6 bytes (after coding)

Figure 32:
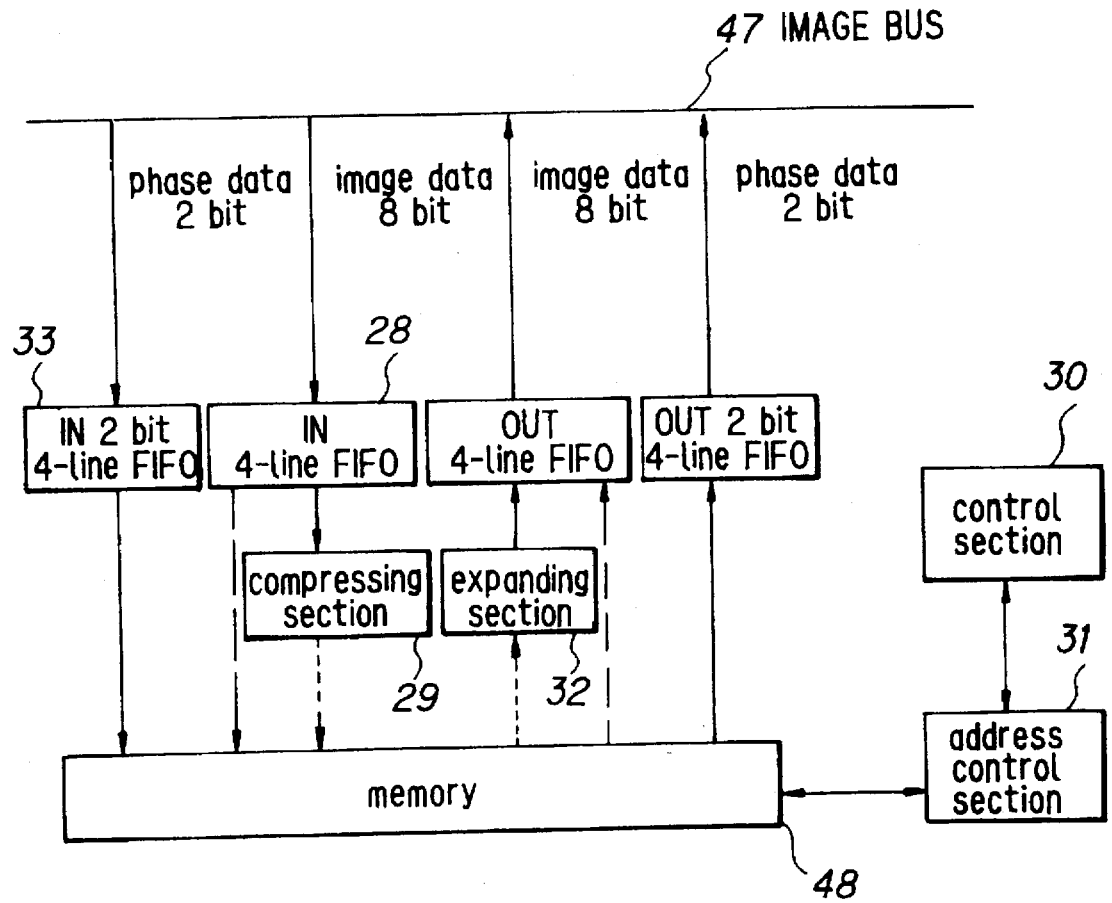
FIG. 32 is a block diagram showing details of the storage section in FIG. 1.

Internal configuration of the storage section 12 is as shown in the block diagram in FIG. 32. Image data processed in each processing section is inputted into a memory 48. This image data is of 8 bits before subjected to tone processing, but is of 10 bits after subjected to tone processing. The image data is stored for 4 lines in a 4-line FIFO memory 28. To realize functions of the storage section 12 with a small memory quantity, image data is compressed in the compressing section 29. The compression is executed according to the GBTC fixed length coding system as described above. The compressed data is stored in the memory 48, and an address is given to the compressed data from an address control section 31 according to an instruction from the control section 30, thus edition such as rotation being enabled. After editing, the compressed data is decoded in an extending section 32, and is outputted as 8-bit image data.

Image data after subjected to tone processing consists of 8 bits for tone data and 2 bits for phase data, and the 2 bits for phase data are stored in a 2-bit 4-line FIFO memory 33 like the image data, and is directly inputted to or outputted from a memory 48, not passing through the compressing section 29 and the extending section.

The storage section 12 has functions for retention, image rotation, INTO 1, image repeat, binary coding simple sorting, and image synthesization. Herein retention is defined as a function making it possible to store an image in the memory 48 by scanning once and output a plurality of image by reading the stored image repeatedly and without scanning the document again. Image rotation is to rotate and output an image, and an angle of rotation is selected from 0°, 90°, 180°, and 270°. The INTO 1 function is defined as a function to scan a plurality of documents and compress the documents according to a predetermined compression rate and output synthesizing the plurality of documents in one sheet. The image repeat is defined as a function to read out a specified area of image data stored in the memory 48 several times and output the specified area read out as described above in one sheet of copy. The binary coding simple sorting is defined as a function to convert multivalued image data read in the scanner section 2 into binary value, store the image data up to 8 sheets in the size of A4 without compressing the image data, sort and stack the images. Finally, the image synthesization is defined as a function to synthesize image data stored in the memory 48 with data read anew from the scanner 2 and output the combined data.

<External Interface>

Figure 33:
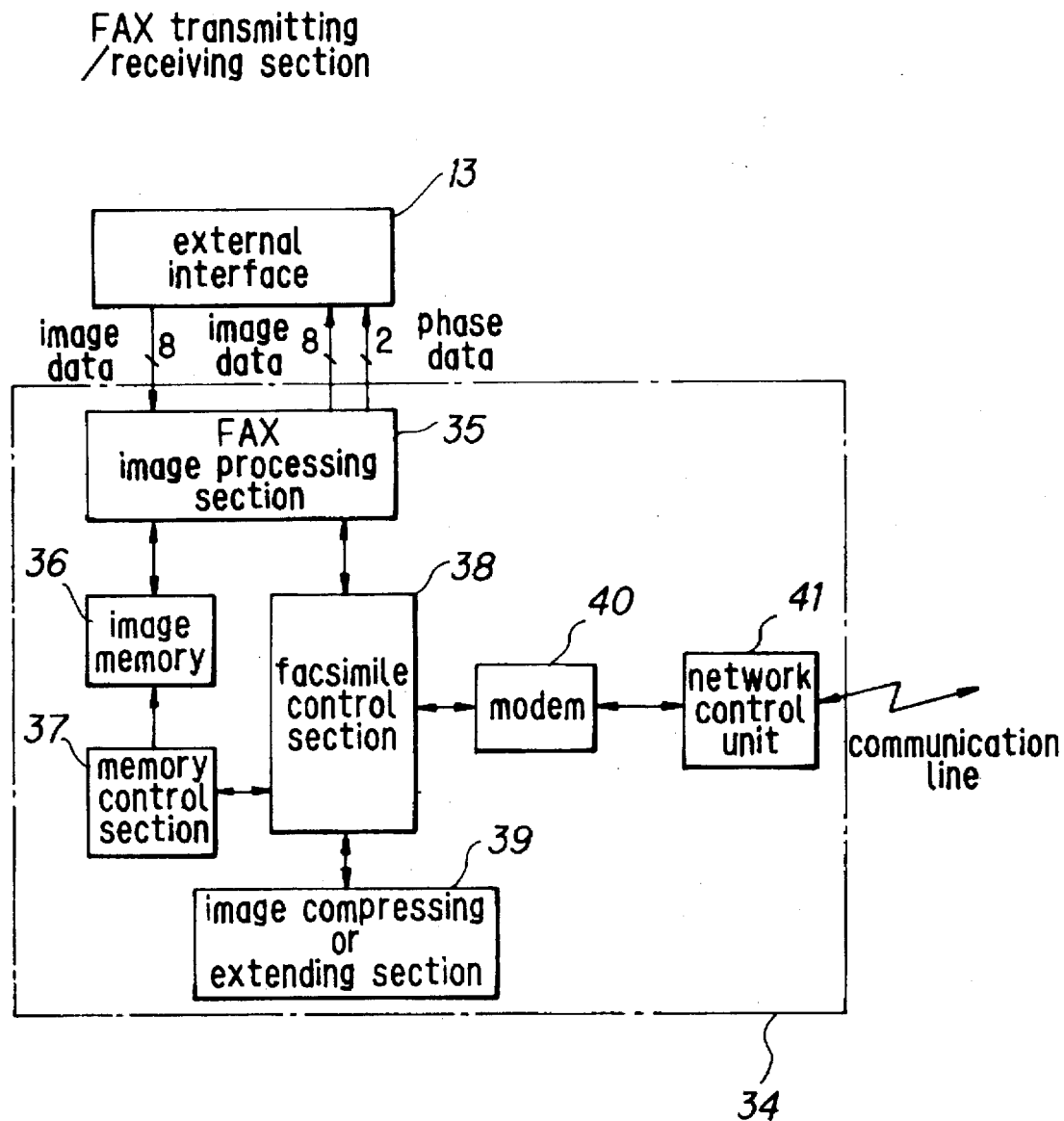
FIG. 33 is a block diagram showing details of the external interface section as well as of the FAX transmitting/receiving section in FIG. 1.

The external interface 13 is an interface between a digital copying machine according to this embodiment and the outside, and for instance, the external interface section 13 functions as an interface with a FAX transmitting/receiving section 34 as shown in FIG. 33. The FAX transmitting/ receiving section 34 changes a format of image data to that for communication, transmits the data to an external line, and also returns a format of data supplied from the outside to that for image data, and records the image data. Also in this case, image data consists of 8 bits, while phase data for record output consists of 2 bits. The entire construction is as shown in FIG. 33. The FAX transmitting/receiving section 34 comprises a FAX image processing section 35, an image memory 36, a memory control section 37, a facsimile control section 38, an image compressing or extending section 39, a modem 40, and a network control unit 41, and the data subjected to correction such as shading correction, $\gamma$ correction, MTF correction, is subjected to image compression by means of the most effective system selected by the image processing section 35, and image data corresponding to the compressed image information is stored in an image memory 36. This image memory has a capacity enough to store image data by up to several tens of sheets of standard documents (for instance, from 20 to 60 sheets) in the compressed state, and the write in/read out operations are controlled by the memory control section 38. Also, image data read out from the image memory 36 can be restored to the original picture signal by the image processing section 35.

The facsimile control section 38 executes a transfer control sequence for facsimile transmission, controls the image compressing or extending section 39, the modem 40, and the network control unit 41, and executes transmitting/ receiving of image data. Also, the facsimile control section 38 transacts control data with the memory control section 37.

The image compressing or extending section 39 compresses an image to be transmitted by means of a code compression system for facsimile transfer, and also extends a received image to the original image signal, and can execute processing for compression or extension by means of a plurality of code compression systems.

The modem 40 modulates digital data to a transmissible waveform via an analog line, demodulates a received signal to the original digital data, and can execute modulation/ demodulation through a plurality of modulation systems. The modem 40 comprises units enabling modulation/ demodulation in the G1, G2, G3 facsimile mode respectively.

The network control unit 41 is used to connect the facsimile machine to a transmission line (in this case, public telephone network), and has an automatic transmitting/ receiving function.

In the FAX transmitting/receiving section 34 constructed as described above, when transfer of image data is started, the facsimile control section 38 gives an instruction to the memory control section 37, and has stored image data read out sequentially from the image memory 36. The image data read out as described above is restored to the original image signal by the FAX image processing section 35, subjected to density conversion processing and image size changing processing, and added to the facsimile control section 38. The image signal added to the facsimile control section 38 is subjected to code compression by the image compressing or extending section 39, modulated by the modem 40, and sent via the network control unit 41 to the destination. The image data transmitted as described above is deleted from the image memory 36.

When receiving an image, the received image is once stored in the image memory 36, and if the received image can be outputted for recording, the image is outputted for recording at a point of time when an image for one sheet has been received. During an operation for copying, when an image signal is transmitted and receiving of the image signal is started, the received image is stored in the image memory 36 until a use ratio of the image memory 36 goes up to a specified value, for instance, 80%, and when the use ratio of the image memory 36 goes up to 80%, the copying operation being executed then is compulsorily interrupted, and the received image is read out from the image memory 36 and is outputted for recording. Then, the received image read out from the image memory 36 is deleted from the image memory 36, the interrupted copying operation is restarted when the use ratio of the image memory 36 drops to a specified value, for instance 10%, and when all the sequence in the copying operation is complete, remaining received images are outputted for recording. Also, after a copying operation is interrupted once, various parameters required for restarting the copying operation such as, for instance, a size of recording paper, a number of copying machines, a number of copies, and darkness are internally saved once so that the copying operation can be started again, and when the copying operation is restarted, the various parameters are internally restored.

<Printing Section>

Figure 34:
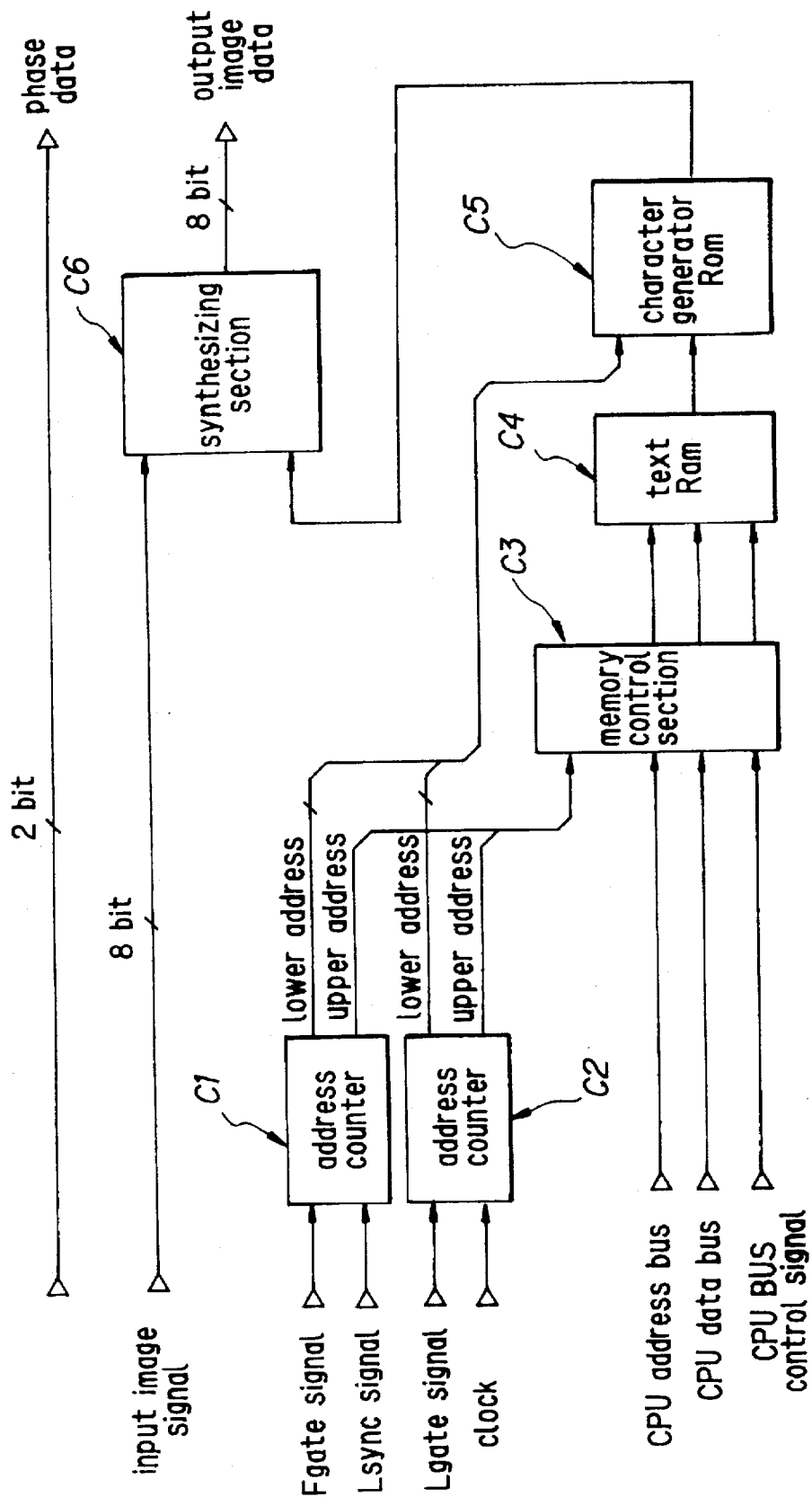
FIG. 34 is a block diagram showing details of the printing (character synthesizing) section in FIG. 1.

FIG. 34 is a block diagram showing configuration of the printing section (character synthesizing section) 14. Input image data inputted into the printing section 14 is of 8 bits, while 2-bit phase data is not processed and passes therethrough as it is. Then the phase "central" is added as phase data to the synthesized character image.

An auxiliary scanning address counter C1 counts a number of lines (main scanning enabled period signal Lsync) during a period while an auxiliary scanning enabled period signal (Fgate) is asserted, and outputs an upper address and a lower address in the auxiliary scanning direction, while the main scanning address counter C2 counts a number of pixels (pixel clock) during a period while the main scanning enabled period signal Lsync is asserted, and outputs an upper address and a lower address in the main scanning direction.

A memory control section C3 controls operations of a text RAM (C4), and the text RAM (C4) has an area corresponding in the form of 1 vs 1 to a position on a document. Also, previously stored in a character generator ROM (C5) is a character bit map image at each address in the order of ASCII code.

When a character for a page number (—1—) as shown in FIG. 35B is synthesized to a document image as shown in FIG. 35A, a CPU previously stores character code such as "2Dh", "31b", "2Dh" ("h" indicating a hexadecimal number, and each code expressing "—", "1", "—" with ASCII code) to be synthesized for document image data via the memory control section C3 in the text RAM (C4) at addresses each corresponding to a synthesized position as shown in FIG. 36A and FIG. 36B. The space code "20h" is stored at other address.

In this state, when a copying operation is started, the memory control section C3 provides controls so that character code data corresponding to a position of the document image will be read out from the text RAM (C4) according to each upper address in the main and auxiliary scanning address counters C1 and C2. Then the bit map image with the character code data read out from the text RAM (C4) as an upper address and each lower address in the main and auxiliary scanning address counters C1 and C2 as the lower address is read out from the character generator ROM (C5), and the document image is synthesized by the synthesizing section C6.

Figure 37:
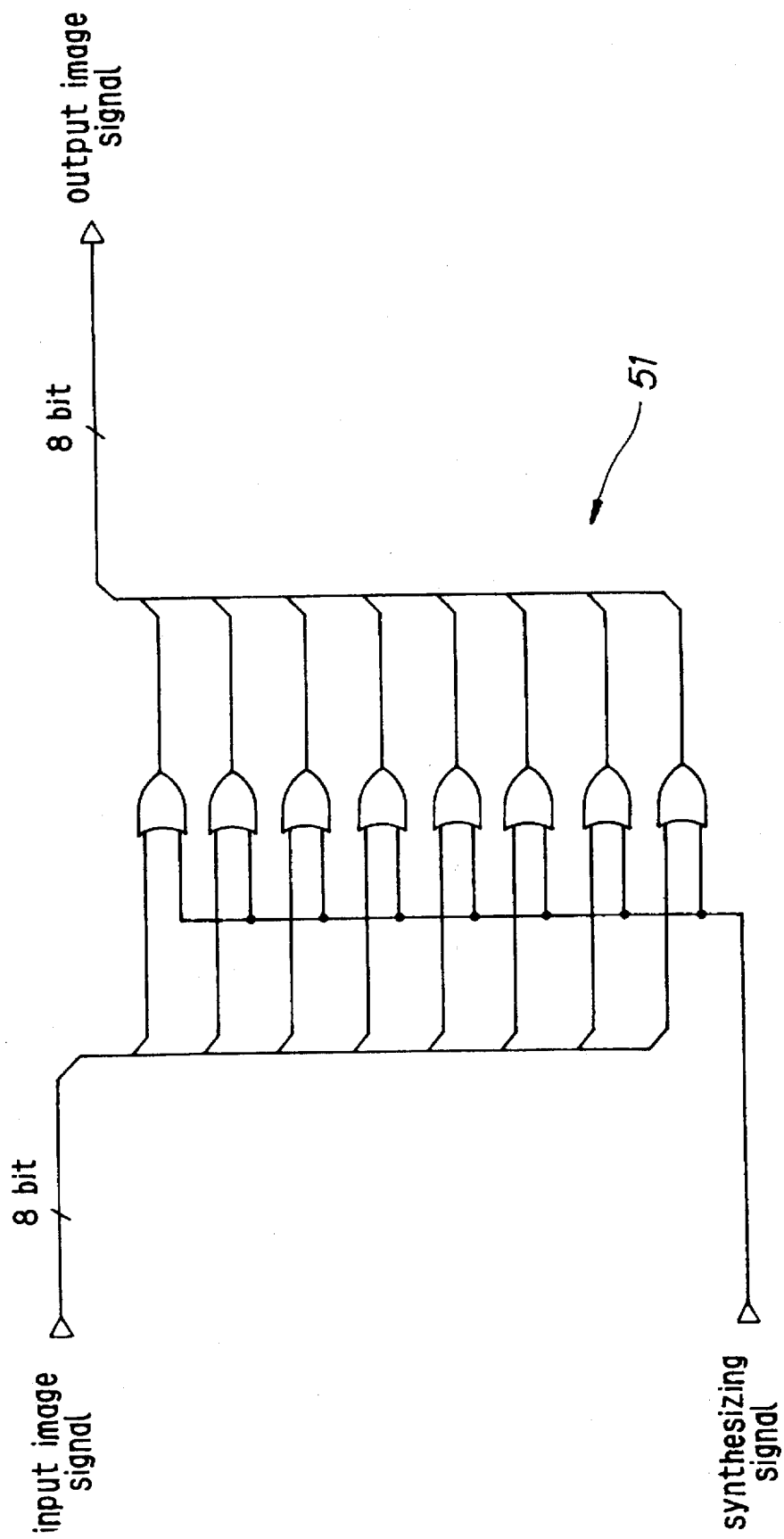
FIG. 37 is a block diagram showing details of the synthesizing section in FIG. 34.
Figure 38:
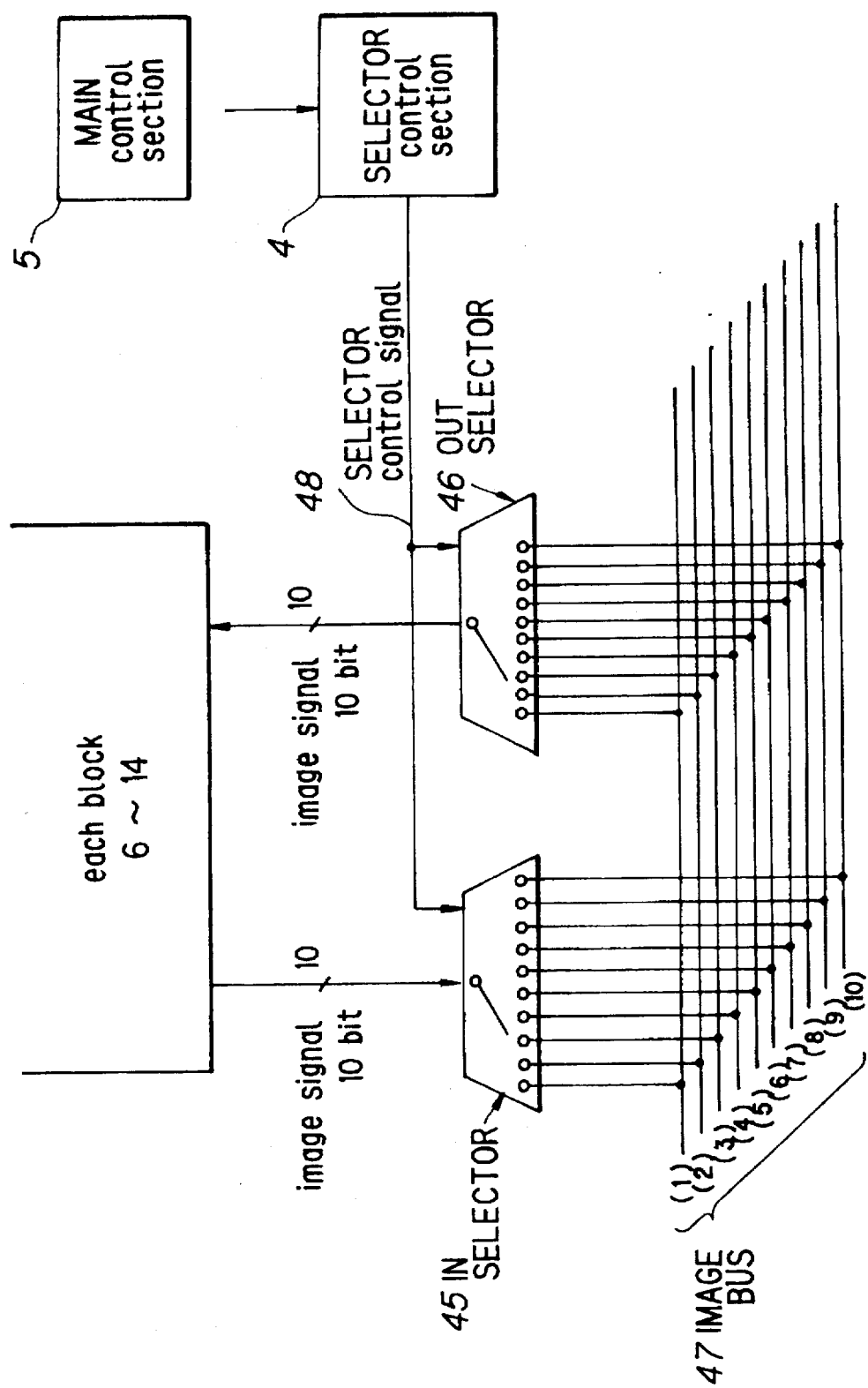
FIG. 38 is a block diagram showing details of a selector connected to each processing section in FIG. 1.

The synthesizing section C6 can be formed with, for instance, an OR gate 51 for 8 bits as shown in FIG. 37, but also the synthesizing section C6 can be formed by using an exclusive logical sum in place of the OR gate 51 when a high darkness document image is superimposed on a character image in synthesizing an image recognizable on recording paper.

<Plot Section>

A plot section 3 prints an image on paper based on 8-bit image data and 2-bit phase data inputted thereinto.

<Operating Section>

In an operating section, a processing sequence and times of processing in each of the processing sections above are freely set according to an instruction by a user, the set data is inputted into the main control section, thus the operating section controlling the selector section.

<General Configuration and Operations>

Next, a detailed description is made for general configuration and operations in the present invention with each section constructed as described above. In the general configuration as shown in FIG. 1, each block has an in-selector 45 and an out-selector 46 which the image signal of 10 bits in total consisting of 8-bit image data and 2-bit phase data can be inputted into or outputted from, and both the selectors 45, 46 are connected to image buses 47 prepared in correspondence to the number of blocks present therein respectively so that an image signal can be sent into or sent from every bus.

10 bits for the image signal read out from the scanner section 2 goes into the shading section 6, where the image signal is corrected against the reference for white color, and then goes into 10 image buses 47. The image signal goes through the image buses 47 (1) to (10) in this order, is sent to each of the blocks 6 to 14, and finally goes into the plot section 3, where the image data is outputted for printing.

All the in-selectors 45 and out-selectors 46 each work under control by the selector control section 4. This selector control section 4 receives information arrayed in the order set up in the main control section 5, and sends a selector control signal 48 having the in-selector 45 and out-selector 46 in each block select the image bus 47 used for input or output.

The in-selector 45 having received the selector control signal 48 selects one of the image buses 47 (1) to (10), and receives an image signal from the bus. Namely, in what order each processing block receives an image signal is decided according to control by the selector control section 4. An image signal inputted into each block is once processed, and then outputted to any of the image buses 47 (1) to (10) selected by the out-selector 46, and is delivered to the next processing block.

For instance, if a processing in the editorial section 11 is executed third time, a control signal is sent from the selector control section 4 so that the image bus 47 (3) is selected for input to a selector in the editorial section 11 and image bus 47 (4) for output, thus the processing sequence being controlled. With the control as described above, a sequence of processing in each processing block in the image processing section 1 can freely be changed, which makes it possible to realize various processing effects by changing the processing sequence.

In the present embodiment, a number of connected blocks is 11 blocks including the scanner section 2 and the plot section 3, so that, although a number of image buses 47 was described as 10 above, 11 buses are also allowable in the configuration according to the present invention (10 bits for 1 bus). Namely, in the present invention, the following is essential:

(A number of connected blocks−1)≦A number of image buses

Also, when the same block is specified twice, as times of use may sometimes exceed a number of image buses, the storage section is automatically set in an order prior to the block selected twice, and then executed.

The same is true also when the same processing section is specified three times or more.

Figure 53A:
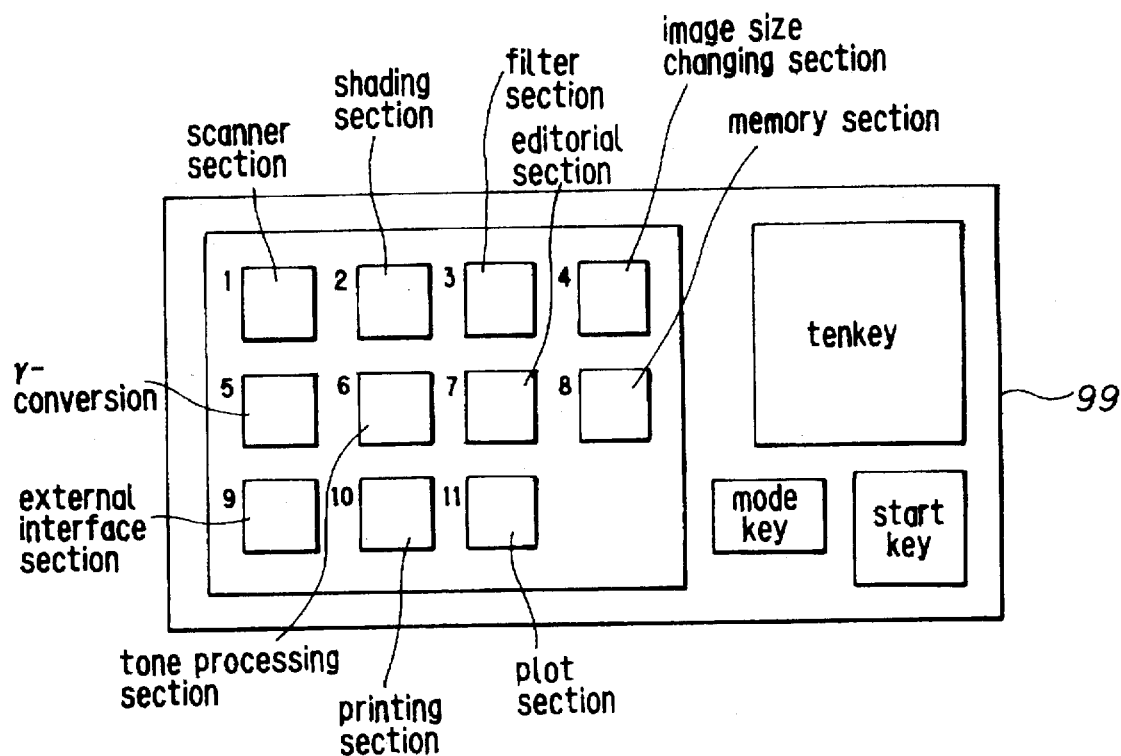
FIGS. 53A and 53B are explanatory views showing configuration of the operating section.
Figure 53B:
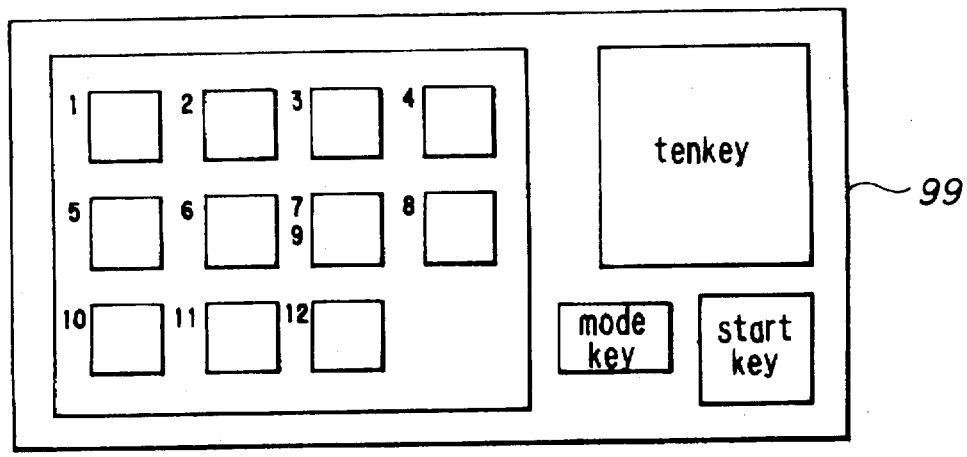

Next, a description is made for the operating section 99 with reference to FIG. 53A and FIG. 53B. Provided in the operating section 99 are a START key, tenkey, a MODE key, and an instruction display section (such as LCT). When the MODE key is OFF, setting is provided so that an image signal is delivered in the order of scanner section, shading section, filter section, size changing section, γ-conversion section, tone processing section, and plot section (initial setting). When the MODE key is turned ON, the scanner section, shading section, filter section, size changing section, γ-conversion section, editorial section, storage section, external interface section, print section, and plot section are displayed on the instruction display section. Then, when a user touches any of the processing sections displayed threrin, a number is displayed aside display of the processing section (Refer to FIG. 53A). This number indicates an order at which the user touched the processing section. When a processing section is touched twice or more, a number corresponding to times of touching is displayed aside display of the processing section (Refer to FIG. 53B). When all the sequence for setting is over and the START key is turned ON, the processing sequence and times of processing specified by the user are automatically set as a processing section and times of processing in the processing section and operations for processing are started.

Also, with this configuration, now description is made for operations and configuration of an image processing apparatus which can executes processing in each processing block several times by using a memory in the storage section 12.

The storage section 12 has the memory 48 to store data for a sheet of original image by compressing an image signal for the original image as described with reference to FIG. 32, so that all image signals are once stored in the memory 48. For this reason, ten (10) image buses 47 are emptied temporarily. An image signal to be outputted from the storage section 12 can freely be selected from the image buses 47 (1) to (10), a target for output. Namely, an image signal going out of a block returns via the storage section 12 to the same block, so that the image signal can be processed twice.

Figure 39:
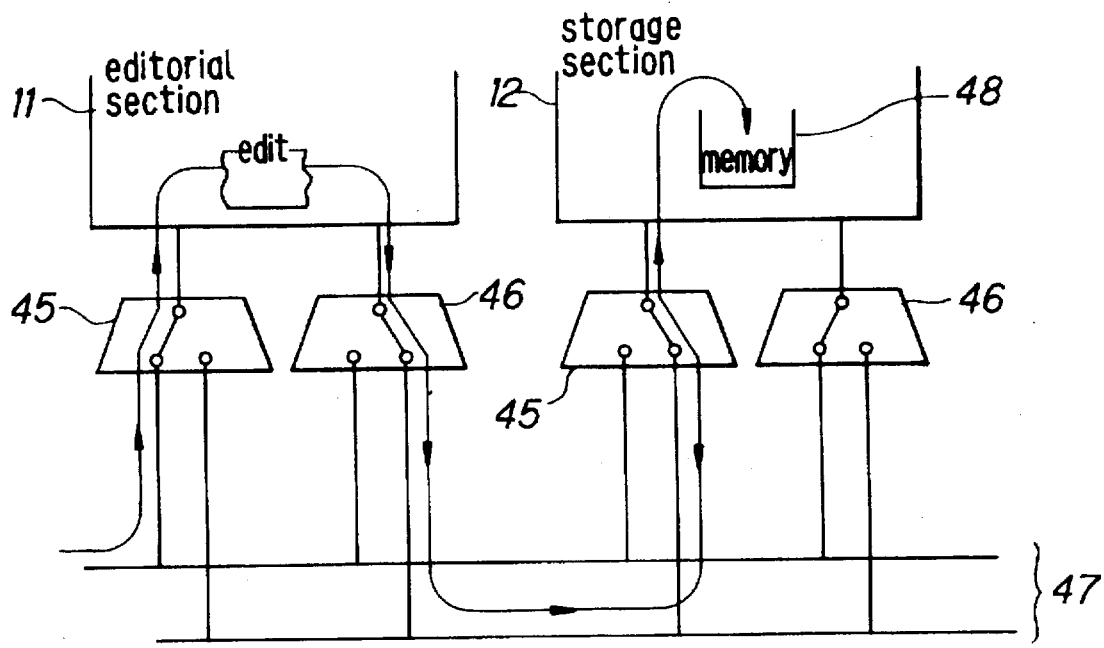
FIG. 39 is an explanatory view showing operations of the selector in FIG. 38.
Figure 40:
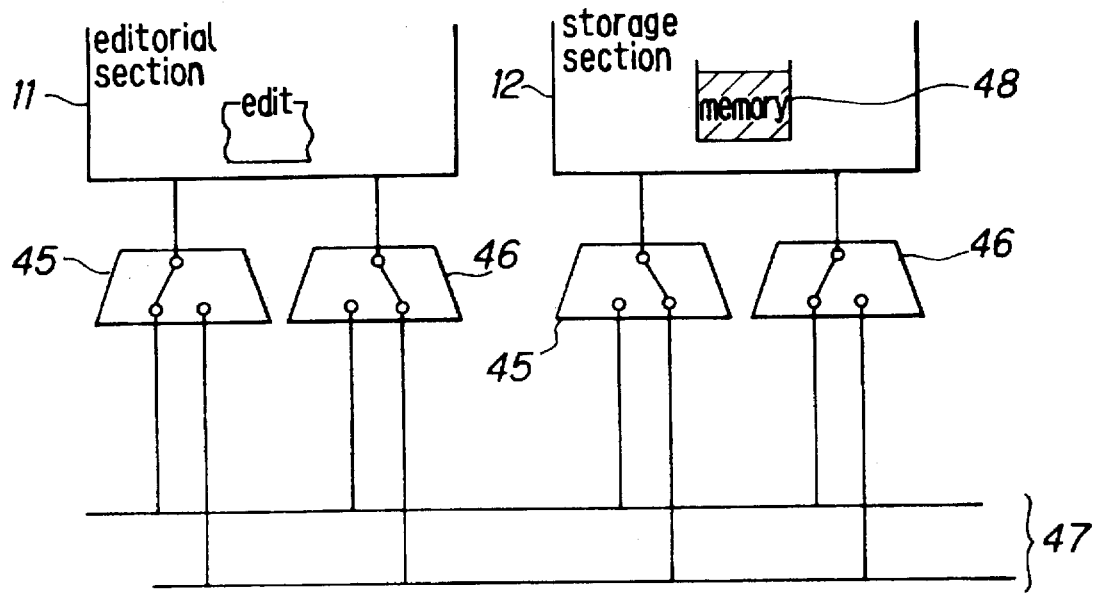
FIG. 40 is an explanatory view showing operations of the selector in FIG. 38.
Figure 41:
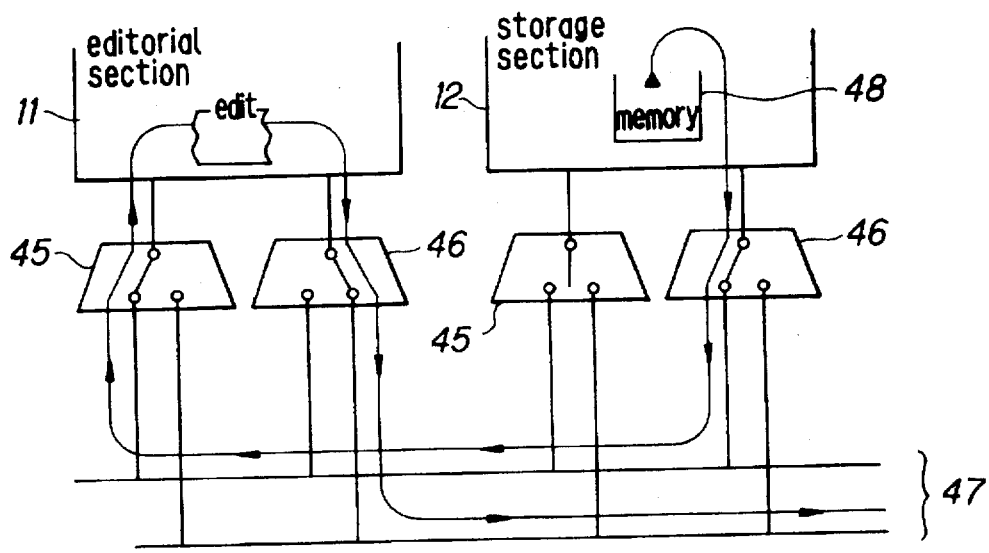
FIG. 41 is an explanatory view showing operations of the selector in FIG. 38.

Next, a description is made for this operation with reference to FIG. 39, FIG. 40 and FIG. 41. At first, as shown in FIG. 39, the image signal processed in the editorial section 11 as shown in FIG. 39 is inputted into the storage section 12, and is stored once in the memory 48 of the storage section 12. The image signal is, as shown in FIG. 40, once stored in the memory 48 of the storage section 12, and during a period when a processing such as rotation is being executed, all the image signals are eliminated from the image bus 47. The image signal outputted from the storage section 12 is inputted again into the editorial section 11 again as shown in FIG. 41, wherein the image data is subjected to editorial processing in the editorial section 11, and then is delivered to the next block.

Thus, by changing a processing sequence of processing blocks according to the intended image processing by making use of the memory 48 in the storage section 12, various processing effects can be achieved. This operation is described below.

(1) Image Path: Image Size Changing Section—Storage Section—Image Size Changing Section After a processing for changing a size of an image in the main scanning direction is executed in the image size changing section 4, the image is turned by 90 degrees in the storage section 12, and then two-dimensional image size changing can be executed by changing a size of the image again. So far image size changing was possible only in the main scanning direction in the image size changing section 4, and image size changing in the auxiliary scanning direction was dependent on a speed of reading with a scanner. However, by having contents of processing in a previous step, namely an image signal for an image subjected to size changing stored in the memory 48 of the storage section 12 once, also image size changing in the auxiliary scanning direction becomes possible.

(2) Image Path: Printing Section—Storage Section Printing Section

After a processing in the printing section 14, by printing again an image rotated in the storage section 12, the image can be printed in a different direction at a different place.

(3) Image Path: Filter Section—Storage Section Filter Section

By rotating an image subjected to a filter processing in the filter section 7 in the storage section 12 and then returning the image to the filter section 7 for a filter processing, one filter can have up to 4 types of filtering characteristics (0°, 90°, 180°, 270°).

(4) Image Path: Image Size Changing Section—Storage Section—Image Size Changing Section By changing a size of an image twice, it becomes possible to raise a limit in magnification. For instance, by changing a size of an image by 400% in the image size changing section 8, storing the image subjected to size changing in the storage section 12, and furthermore returning the image to the image size changing section 3 to change the image size again by 400%, image size changing by 1600% is realized (400%×400%=1600%).

(5) Image Path: Editorial Section—Storage Section Editorial Section

In the editorial section 11, editorial works such as inclination, mirroring, and moving can be executed, and by editing again an image once edited in the editorial section 11 through the storage section 12, each image can be processed twice in the editorial section, so that diversified editorial works other than specified ones can be executed.

(6) Image Path: Editorial Section (Inclination)—Tone Processing Section—Storage Section—Editorial Section (Inclination)

By executing the operations as described above, a screen angle can be changed. Namely, in a multi-valued dither processing in the tone processing section 10, each pixel is quantized by comparing it to an N×N threshold value matrix. The threshold value matrix allows concentration of a dot array in a direction crossing the main scanning direction at a certain angle. The angle is called screen angle. When an screen angle is changed, the resolution and gradation are improved, so that this operation is effective in processing some type of original images.

Figure 42:
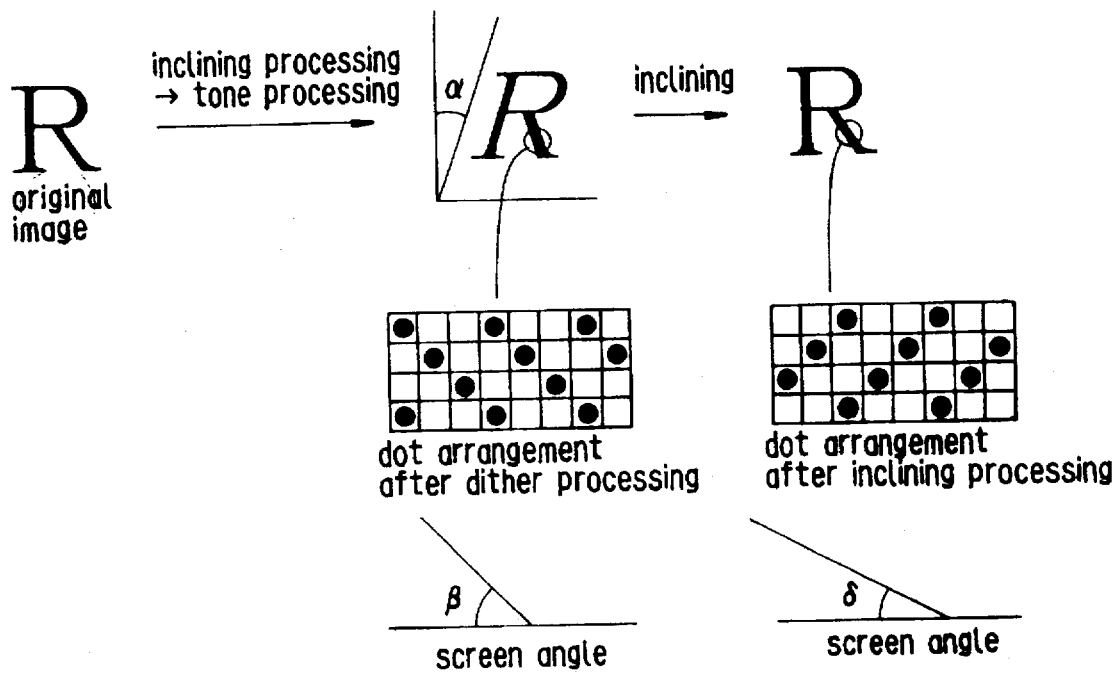
FIG. 42 is an explanatory view showing an image processing for giving a screen angle to an inclined image.

The processing sequence above is shown in FIG. 42. In this processing, an image is first inclined in the editorial section 11 by an angle α against the main scanning direction. Then dither processing is executed to the inclined image to give the image a certain screen angle β against the auxiliary scanning direction. The image is again inclined by −α against the main scanning direction to return the image to the original state. As a result, the screen angle changes to δ against the auxiliary scanning direction. Namely, a different screen angle can be made by changing an angle for inclination. By changing a screen angle, a plurality of screen angles can advantageously be obtained with one threshold value matrix.

(7) Image Path: Editorial Section (Inclination)—Image Size Changing Section—Storage Section—Image Size Changing Section—Editorial Section (Inclination)

By executing the operations above, an image can be rotated by any degree freely. The operating sequence is described below.

When an image (x, y) distant from a reference of the object image to be processed by x pixels in the main scanning direction and by y pixels in the auxiliary scanning direction is freely rotated by θ:

$$x'=x \cos\theta + y \sin\theta, \quad y'=y \qquad (a)$$

Namely, the image is shifted by $y \sin\theta$ against the main scanning direction in a processing for inclination in the editorial section 11, and then the size is changed by $x \cos\theta$ times in the image size changing section 8.

$$x''=y', \quad y''=x' \qquad (b)$$

Namely, the image is rotated by 90° in the storage section 12.

$$x'''=x'' 2 \sin\theta + y''', \quad y'''=y'' \qquad (c)$$

Namely, the same processing as that in (a) is executed.

By executing operations in (a), (b) and (c), an image can be rotated by any degree.

(8) Image Path: Shading Section—Filter Section Image Size Changing Section—γ-Conversion Processing Section—Editorial Section—Printing Section Storage Section—Tone Processing Section—External Interface Section—Plot Section 8-bit image data from the shading section 6 is subjected to γ-conversion in the γ-conversion section 9. Data subjected to γ-conversion is edited in the editorial section 11. Then, necessary characters are generated in the printing section 14. This image data is compressed and once stored in the storage section 12, and then is inputted to the tone processing section 10. Then 2-bit phase data is added to the 8-bit image data in the tone processing section 10, and is outputted via the external interface section 13 to the outside, or from the plot section 3.

When forming an image as described above, image data subjected to editorial work and character synthesization is once stored in the storage section and then tone processing is executed, so that any collapse will never occur in image data after compression in a memory section nor in the phase data.

(9) Image Path: Shading Section—Filter Section Image Size Changing Section—γ-Conversion Section Storage Section—Tone Processing Section—Editorial Section Printing Section—External Interface Section—Plot Section 8-bit image data from the shading section 6 is at first subjected to γ-conversion in the γ-conversion section 9. The data subjected to γ-conversion is compressed and once stored in the storage section 12, and then 2-bit phase data is added to the 8-bit image data in the tone processing section 10. Then the image data is edited in the editorial section 11. Also, necessary characters are generated in the printing section 14, and is outputted to the external interface section 13 or the plot section 3.

When an image is formed as described above, data subjected to γ-conversion is once stored in the storage section and then subjected to tone processing, so that no collapse will occur in image data compressed in a memory nor in the phase data.

(10) Image Path: Shading Section—Filter Section Image Size Changing Section—γ-Conversion Section Editorial Section—Printing Section—Storage Section—External Interface Section—Tone Processing Section—Plot Section 8-bit image data from an external device is subjected, like image data from the shading section 6, to processing for image data as well as for phase data through the external interface section 13 in the tone processing section 10, and is outputted from the plot section 3.

When processed as described above, image data from an external device is outputted, using an external interface, through the tone processing section, so that access to a tone processing function in the external device is possible.

(11) Image Path: Shading Section—External Interface Section—Filter Section—Image Size Changing Section—γ-Conversion Section—Editorial Section—Printing Section—Storage Section—Tone Processing Section Plot Section 8-bit image data from an external device passes through the external interface section 13, and is outputted, like image data from the shading section 6, via the filter section 7, image size changing section 10, γ-conversion section 9, editorial section 11, printing section 14, storage section 12, and tone processing section 10 from the plot section 3.

When processed as described above, image data from an external device is outputted, using an external interface, via the filter section 7, image size changing section 8, γ-conversion section 9, editorial section 11, printing section 14, storage section 12, and tone processing section 10, so that it becomes possible to access to the filter section 7, image size changing section 8, γ-conversion section 9, editorial section 11, printing section 14, storage section 12, and tone processing section 10 in the external device.

(12) Image Path: Shading Section—Filter Section Image Size Changing Section—γ-Conversion Section Tone Processing Section—Printing Section—Editorial Section—Storage Section—External Interface Section—Plot Section 8-bit data from the shading section 6 passes through the γ-conversion section 9 and tone processing section 10 and specified characters are generated in the printing section 14.

This image data is subjected to editorial work in the editorial section 11 and is once stored in the storage section 12. Then the image data is outputted to the external interface section 13 or the plot section 3.

(13) Image Path: Shading Section—Filter Section—Image Size Changing Section—γ-Conversion Section Tone Processing Section—Editorial Section—Printing Section—External Interface Section—Storage Section—Plot Section 8-bit image data from an external device passes through the external interface section 13, and is once stored, like the image data from the shading section 6, in the storage section 12 and is outputted from the plot section 3.

Figure 43A:
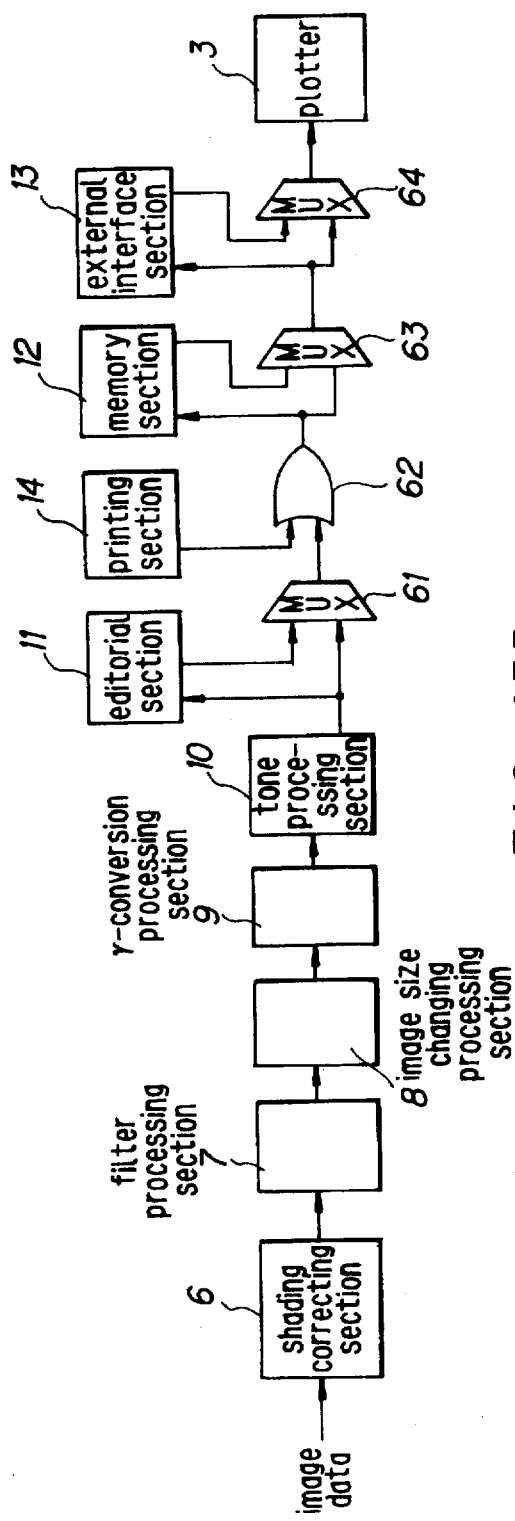
FIGS. 43A, 43B and 43C are block diagrams showing a concrete example of an image path in an image processing device according to Embodiment 2 of the present invention.
Figure 43B:
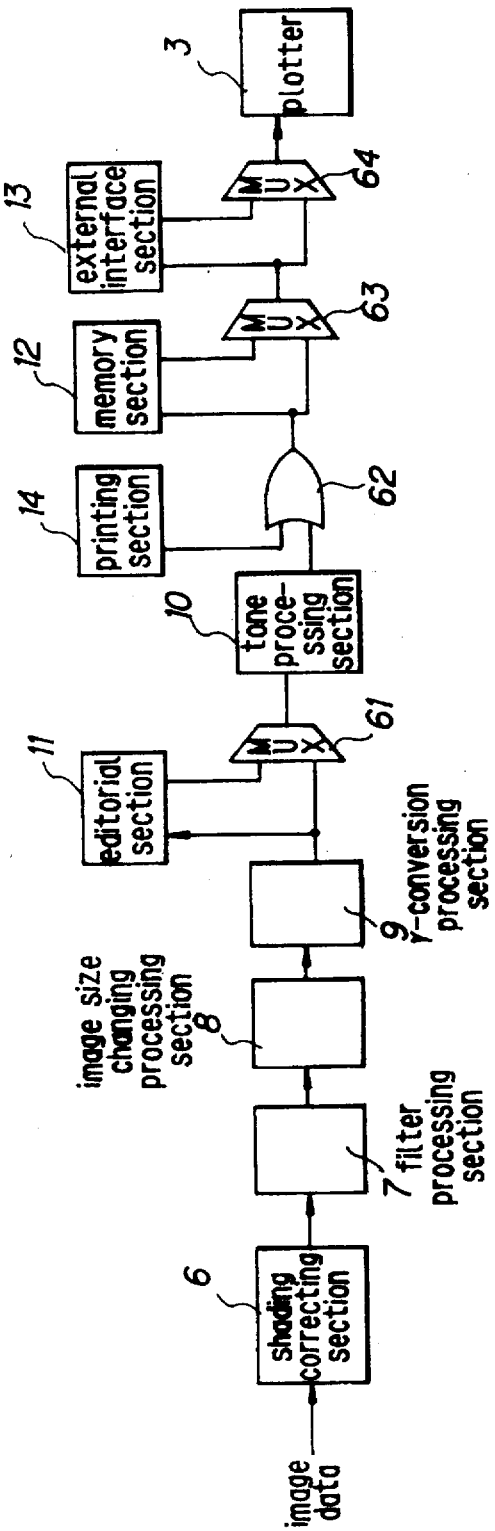
Figure 43C:
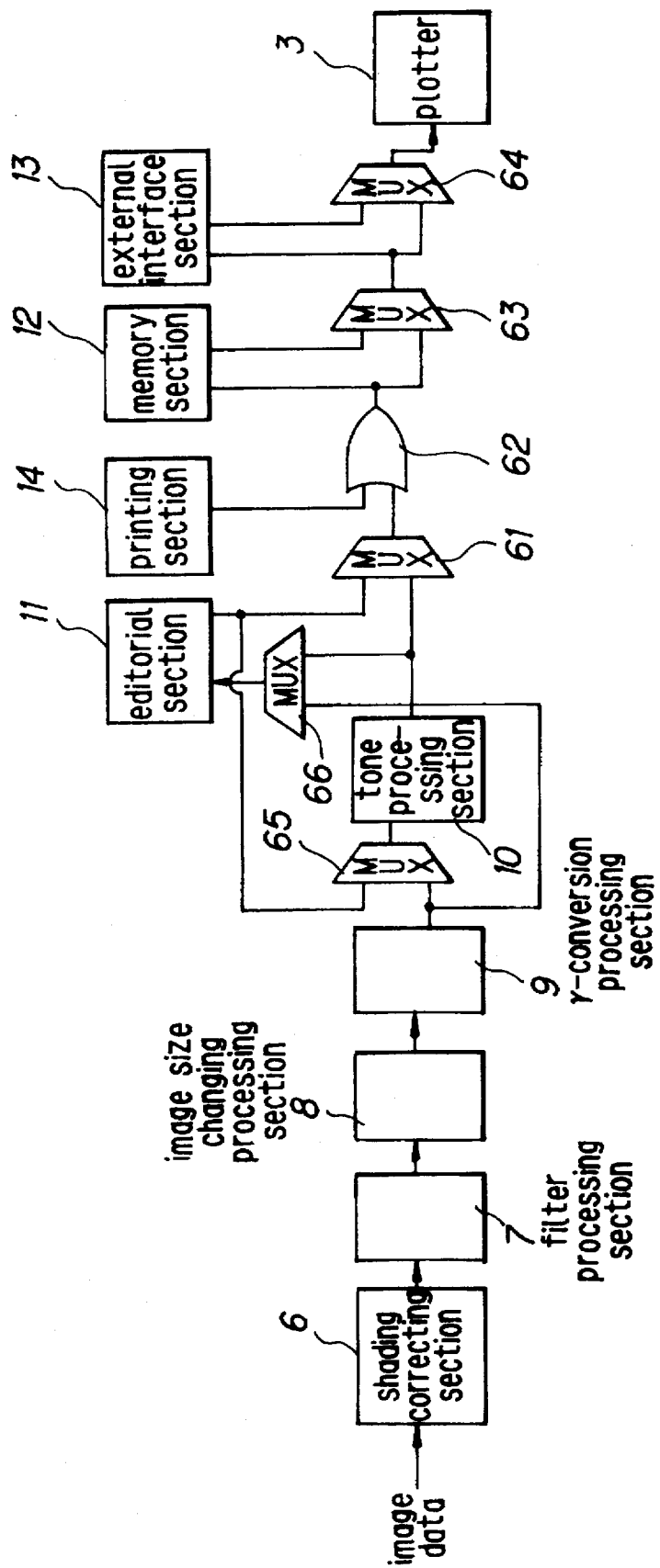

Next, a description is made for an image path in an image processing device according to a second embodiment of the present invention with reference to FIGS. 43A to 43C. It should be noted that, also in this embodiment, the same reference numerals are assigned to the same or corresponding sections as those in Embodiment 1 above, and description thereof is omitted therein. In the image path shown in FIG. 43A, image data from the shading correcting section 6 is loaded via the filter processing section 7 and image size changing section 8 to the γ-conversion section. Data subjected to γ-conversion is subjected to tone processing in the tone processing section and is converted to binary values through this tone processing.

Then the data is directly outputted via a multiplexer 51, OR gate 52, and multiplexers 53, 54 to the plotter 3, or subjected to editorial works such as deleting in the editorial section 11 (the multiplexer 51) according to conditions set in an operation section, or characters are synthesized by the printing section 14 (the OR gate 52) or stored in the storage section 12 (by the multiplexer 53), and then is outputted to the plotter 3 or is outputted via the external interface section 13 to an external device.

In the image path, a variant shown in FIG. 43B, image data from the shading correcting section 6 is similarly loaded via the filter processing section 7 and image size changing section 8 to the γ-conversion section 9. Then the data subjected to γ-conversion is subjected to editorial works such as deleting in the editorial section 11 according to conditions set in an operating section (multiplexer 51), and then is subjected to tone processing by the tone processing section 10. Then similarly the data is outputted directly to the plotter 3, or characters are synthesized by the printing section 14 or stored in the storage section 12, and then is outputted to the plotter 3 or is outputted via the external interface section 13 to an external device.

In the image path, another variant shown in FIG. 43C, similarly the image data from the shading correcting section 6 is loaded via the filter processing section 7 and image size changing section 8 to the γ-conversion section 9. Then the data subjected to γ-conversion goes via a multiplexer 55 directly to the tone processing section 10 according to conditions set for editing, or goes via a multiplexer 56 and the editorial section 11 to the tone processing section 10. In case of processing with binary values data such as deleting according to conditions set for editorial works, at first a processing (binary value coding processing) is executed in the tone processing section 10 and then editorial work is executed, while in case of a processing with 8 bits such as a processing for inclining an image as a whole or mirroring, editorial work is executed first and then tone processing is executed.

Data from this tone processing section 10 or editorial section 11 is similarly outputted directly to the plotter 3, or subjected to editorial works such as deleting according to conditions set in an operating section in the editorial section 11, or characters are synthesized thereon by the printing section 14, or stored in the storage section 12, and then is outputted to the plotter 3 or is outputted via the external interface section 13 to an external device.

[Third Embodiment]

Next, a description is made for a third embodiment of the present invention with reference to related drawings. It should be noted that in the following description the same reference numerals are assigned to the same components as those in the first embodiment described above and description thereof is omitted herein.

Figure 44:
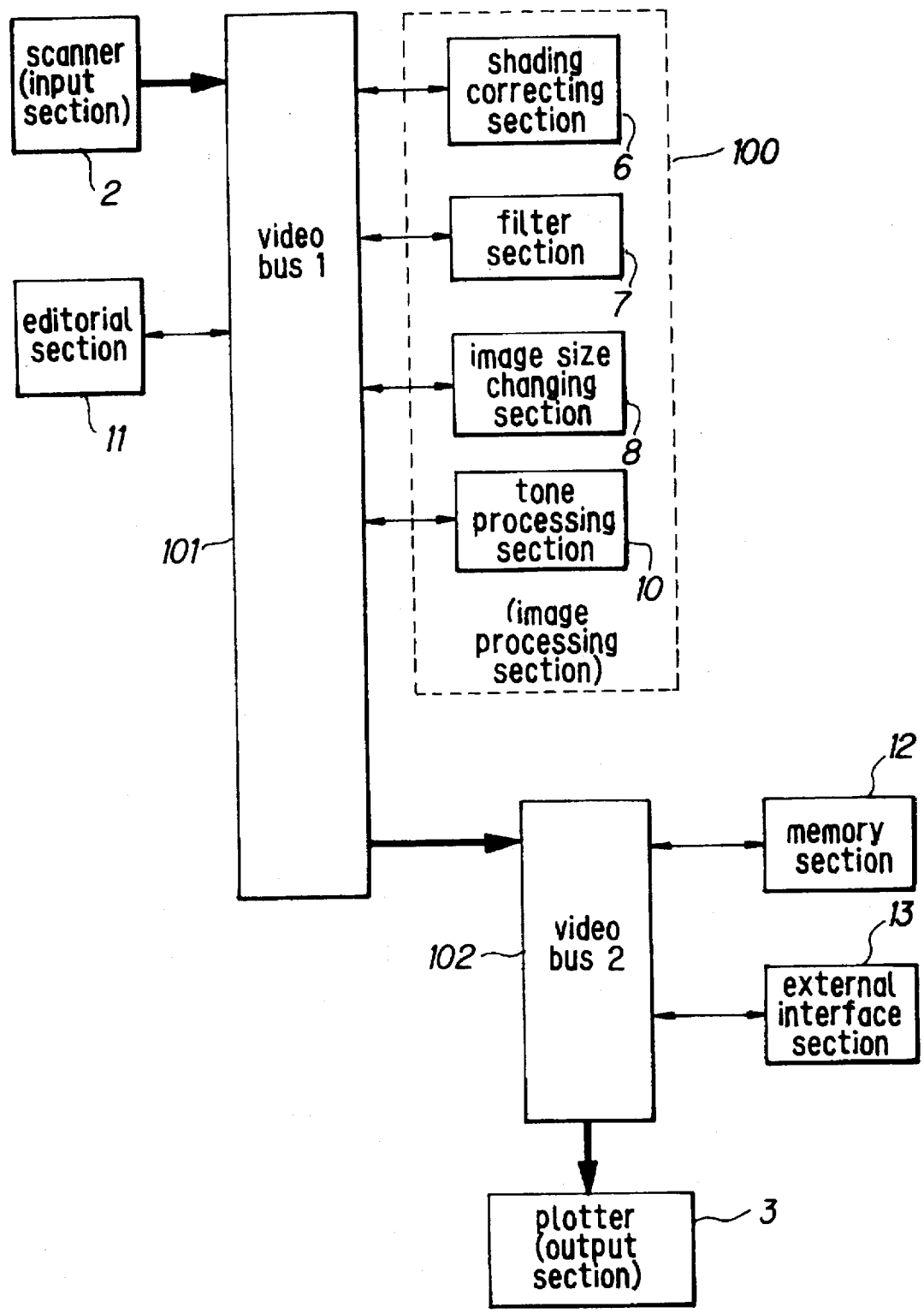
FIG. 44 is a block diagram showing entire configuration of an image processing device according to Embodiment 3 of the present invention.

FIG. 44 is a block diagram showing configuration of an image processing device according to this embodiment. In this figure, the image processing device according to the embodiment comprises a scanner section (input section) 2 for reading an image, an internal image processing section 100 for executing various types of correction to an inputted image (called "image processing section" hereinafter), an editorial section 11 for processing or editing image data, a scanner section, a first video bus 101 unifying the editorial section 11 and the image processing section 100 (shows as "video bus 1" in the figure), an external storage section 2 to the image processing section 100, an external interface section 13 for transacting data with other image processing unit, a plot section (output section) 3 for printing image data onto recording paper, and a second video bus 102 (shown as "video bus 2" in the figure) unifying output data from the video bus 1 and output data from the storage section 12, external interface section 13 and plot section 3.

The aforesaid image processing section 100 comprises the shading correcting section 6 for correcting nonuniformity in an illumination system, the filter section 7 for converting the frequency characteristics of an image signal, the image size changing section 8 for changing an image signal size in the main scanning direction, and the tone processing section 10 for executing at least one of multi-valued coding processing, error diffusion processing, multi-valued dither processing, and binary value coding processing.

A flow of image signals in a first video bus 101 may not always be sequential, and the sequence of processing in each functional block may be changed according to the necessity. In general image processing, an image signal optically read in the scanner section 2 is subjected to shading correction for the illumination system in the shading correction section 6, and in the filter section 7, if the image processing mode is "character" mode, processing for emphasis is executed to correct MTF degradation of the optical system, and if the image processing is "photograph" mode, processing for smoothing is to remove moire. If a processing for enlarging is required to an image signal subjected to any of the filter processing described above, a processing for enlarging in the main scanning direction is executed by means of interpolation in the image size changing section 8. In case of compression, likely a thinning processing in the main scanning direction is executed by means of resampling in the size changing section 8. Then a processing is executed according to the image quality mode; concretely multi-valued coding processing to "character" and multi-valued dither processing or the like to "photograph" in the tone processing section 10. These steps are the same as those in the first embodiment described above.

In contrast, as a processing for changing a sequence of functional blocks, there is, for instance, a procedure for replacing an order of processing by the filter section 7 with that by the image size changing section 8 when in the "compression" mode. When a processing for emphasis is executed in the filter section 7 to an image signal previously subjected to a processing for compression, the same effect can be obtained even with a filter coefficient slightly lower than an ordinary value, and moire is suppressed, so that a high quality image can be reproduced. The image signal subjected to any of the internal image processing is transferred from a first video bus 101 to a second video bus 102.

Figure 45:
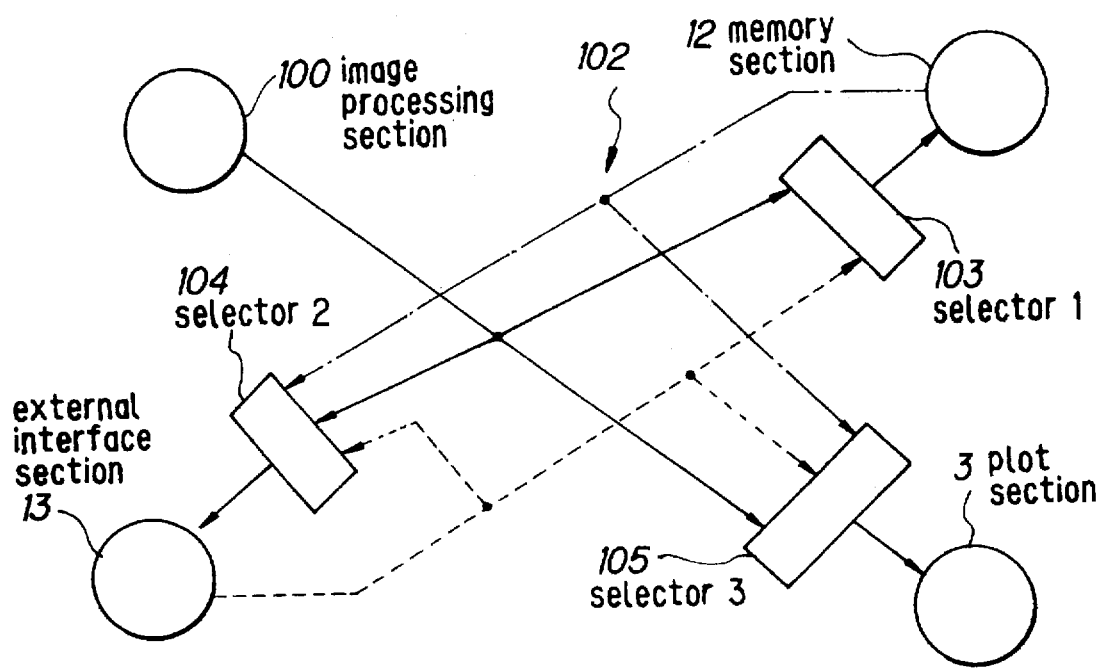
FIG. 45 is a block diagram showing configuration of the video bus 2 in FIG. 44

FIG. 45 shows configuration of the second video bus 102 shown in FIG. 44. The image processing section 100 shown in this figure is an output terminal of the first video bus 101 shown in FIG. 44. An image input to this second video bus 102 is each of signals from the image processing section 100, storage section 12, and external interface section 13, while image output from the second video bus 102 is sent to and processed in each of the plot section 3, storage section 12, and external interface section 13, and first to third selectors 103, 104 and 105 are provided for switching an image signal to each I/O terminal. The third selector ("Selector 3" in the figure) 105 for selecting output to the plotter 3 selects an input signal from any of the image processing section 100, storage section 12, and external interface section 13. The first selector 103 ("selector 1" in this figure) for selecting output to the storage section 12 selects an input signal from the image processing 100 and the external interface section 13. A sequence for processing image signals in the second video bus 102 is controlled independently from a sequence in the first video bus 101.

Figure 46:
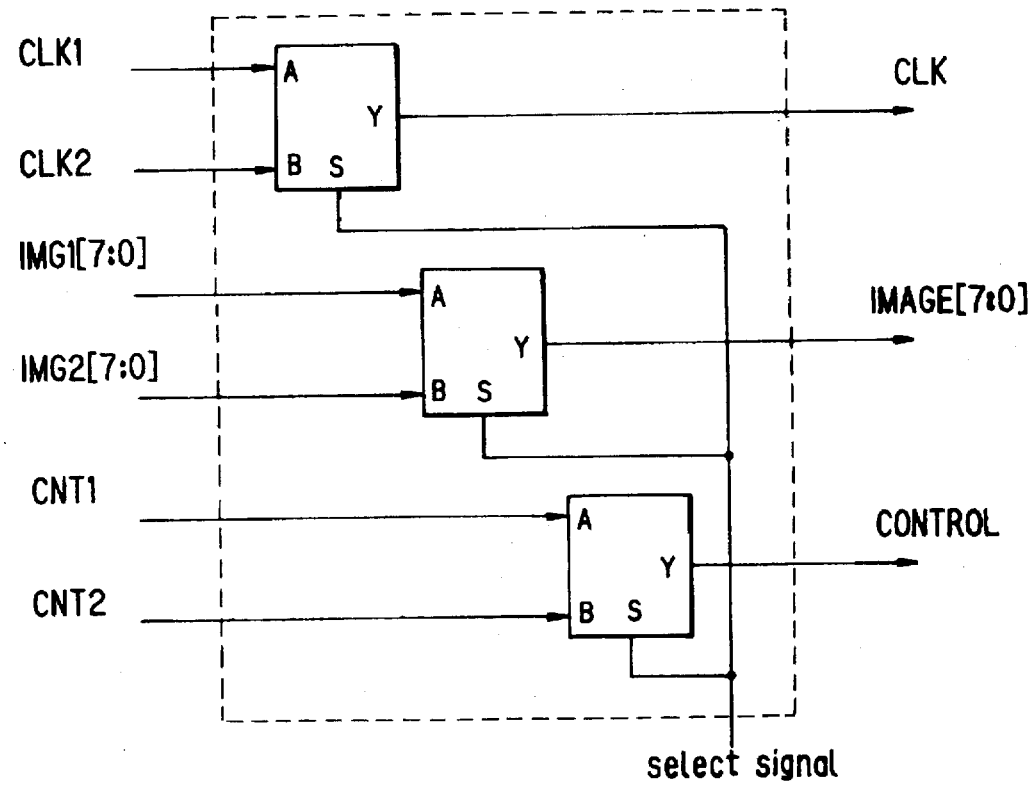
FIG. 46 is a block diagram showing configuration of the selector in FIG. 45.

FIG. 46 shows configuration of each selector in FIG. 45. This configuration is an example of the first selector 103 for selecting image output to the storage section 12. In this figure, a group of input signals from the image processing section 100 is indicated by the suffix of 1, while a group of input signals from the external interface section 13 is indicated by the suffix of 2. Each signal group comprises a pixel clock CK1 or CK2, an image signal IMG1 or IMG2, and a control signal for specifying an image area CNT1 or CNT2. A group of output signals to the storage section 12, a pixel clock CLK, an image signal IMAGE, and a control signal CONTROL are switched according to a select signal SEL outputted from the selector control section 4 upon output of an instruction from the memory control section 5. An input signal from the scanner 2 runs according to a pixel clock CLK1 and a control signal CNT1 for an image area. In contrast, in the second video bus 102, a pixel clock and an area control signal from a completely different system can be selected to form an image input system independent from an input system from the scanner 2. An output system controlled by the second video bus 102 includes an output system to the plotter 3, and in one image processing device, it is possible to control an image input system and an image output system according to independent pixel clocks and image area signals respectively.

Figure 47:
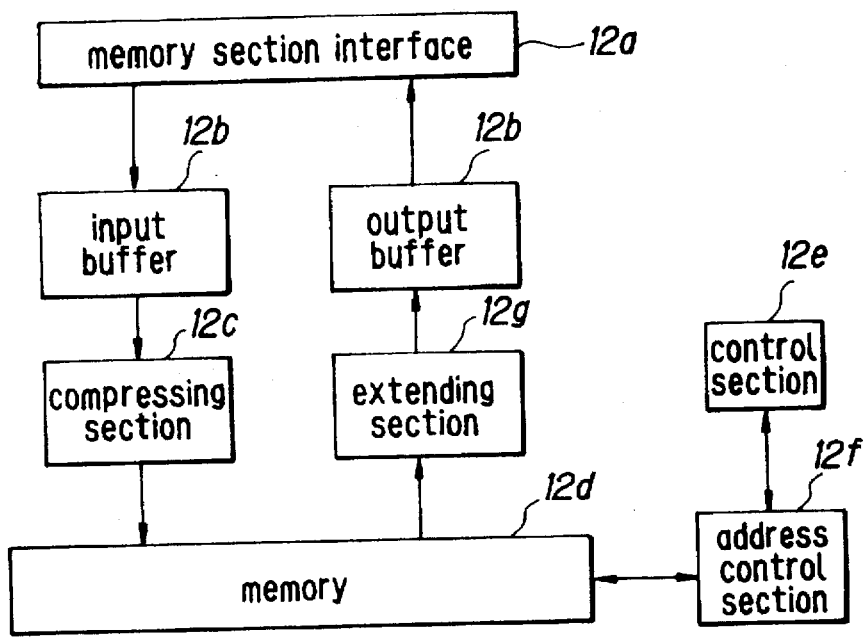
FIG. 47 is a view showing details of the storage section in FIG. 44.

FIG. 47 shows an example of the storage system. The storage section 12 has a large capacity page memory, and realizes such functions as electronic sort, retention, and image rotation by having the memory 12d store image data. It should be noted that the retention is defined herein as making a number of copies by scanning one time. Next, a description is made for internal construction of the storage section 12.

In an interface 12a for the storage section 12, an image signal outputted from a second video bus 102 is fetched together with a pixel clock and an image area control signal into the storage section 12. The inputted image signal is once subjected to data buffering in an input buffer 12b, and image compression is executed in a compressing section 12c. The compressed image data is stored in a memory 12d with an address from an address control section 12f given to it according to an instruction from a control section 12e, and then is subjected to editorial processing such as rotation. After editing, the compressed image data is decoded in an extending section 12g, subjected to buffering in an output buffer 12h, and then is sent together with a pixel clock and an image area control signal via the storage section interface 12a to the second video bus 102.

With the configuration as described above, the storage section 12 has functions for retention, image rotation, (INTO 1), electronic sort, and image synthesization. The retention defined herein is as described above, but more detailedly it is a function to store data in a memory by inputting image data once and read the image repeatedly. The image rotation as defined herein is a function to output an image in a rotated sate. The (INTO 1) function as defined herein is a function to compress a plurality of document images according to a predetermined compression ratio and output the images synthesizing them into one sheet of copy. The electronic sort as defined herein is a function to accumulate image data for a plurality sheet of documents in a memory and then execute image sorting and stacking. Also, the image synthesization as defined herein is a function to synthesize image data stored in a memory with image data inputted anew and output the synthesized image. It should be noted that the input image as defined herein does not always indicate data inputted from a scanner, and includes image data inputted via the second video bus 102 into the storage section.

Figure 48:
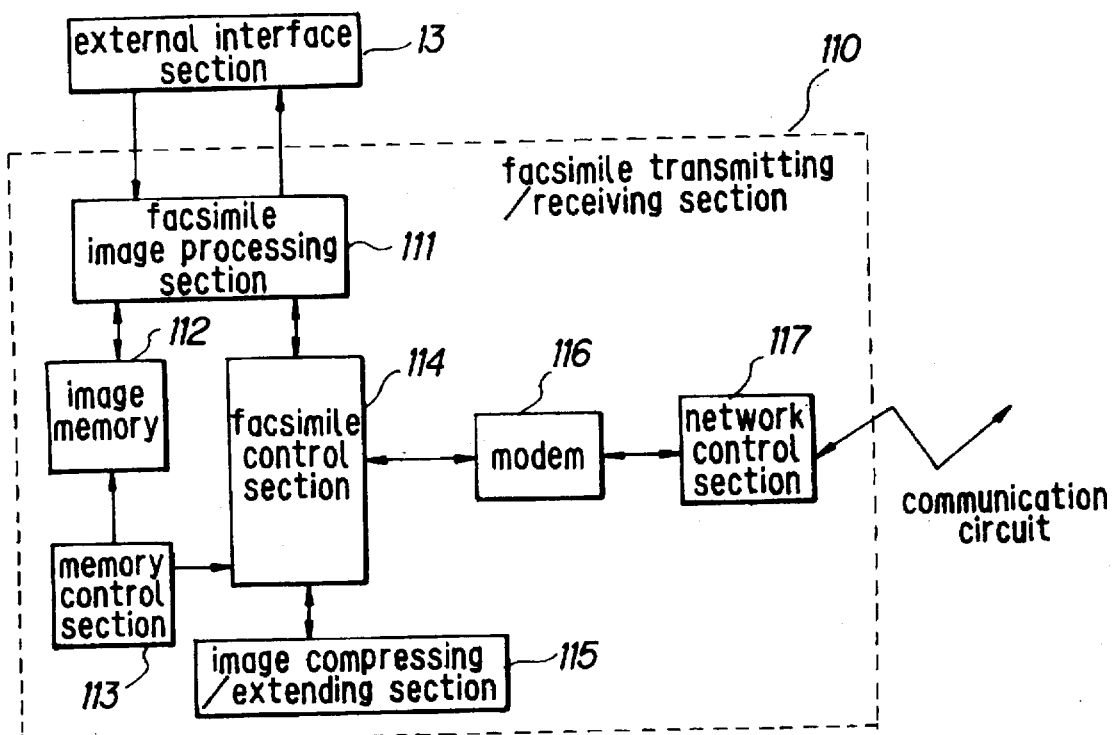
FIG. 48 is a block diagram showing details of the external interface section as well as of the FAX transmitting/ receiving section in FIG. 44.

The external interface section 13 is an interface between a digital copying machine according to this embodiment and external devices as shown in FIG. 1, and is connected to such devices as a personal computer, a printer, or a facsimile machine, and an external unit, to which the external interface section 13 is connected, is selected by the selector control section 4 according to an instruction from the main control section 5. FIG. 48 shows configuration of the external interface section 13 when functioning as an interface for the facsimile transmitting/receiving section.

The facsimile transmitting/receiving section 110 converts a format of image data to that for communications and transmits the converted image data to an external line, and also converts a format of data received from the outside to that for image data and outputs the image data via the external interface section and the second video bus 102 to the plot section 3. The facsimile transmitting/receiving section 110 comprises a facsimile image processing section 111, an image memory 112, a memory control section 113, a facsimile control section 114, an image compressing/ extending section 115, a modem 116, and a network control section 117. In the facsimile transmitting/receiving section 110 constructed as described above, when transfer of image data is started, the facsimile control section 114 gives an instruction to the memory control section 113 to have image data accumulated in the image memory 112 read out successively therefrom. The image data read out as described above is subjected to code compression in the facsimile image processing section 111, modulated by the modem 116, and is then sent to a destination through the network control unit 117. Then the image data already transmitted is deleted from the image memory 112.

When receiving image data, the receiving images are once stored in the image memory 112, and if the received images can be outputted for recording, the image is outputted for recording at a point of time when receiving of image data for one sheet is complete. Also, during an operation for copying, when a signal is transmitted and receiving is started, image data is accumulated in the image memory 112 until a use ratio of the image memory 112 goes up to a specified value, for instance, 80%, and when the use ratio of the image memory 112 has reached 80%, the image reader compulsorily interrupts the operation for copying, and has the received image read out and outputted from the image memory 112. Then the received image already read out from the image memory 112 is deleted from the image memory 112, and when the use ratio of the image memory 112 drops to a specified value, for instance, 10%, the operation for copying having been interrupted is restarted, and when all the sequence for the copying operation is complete, remaining received image is outputted for recording. Also, various parameters for copying operation at the point of time when the copying operation is interrupted, such as a size of recording paper, a number of copying machines, a number of copies, darkness, are internally saved so that the copying operation can easily be restarted after interrupted once, and the various parameters are restored internally when the copying operation is restarted.

Figure 49:
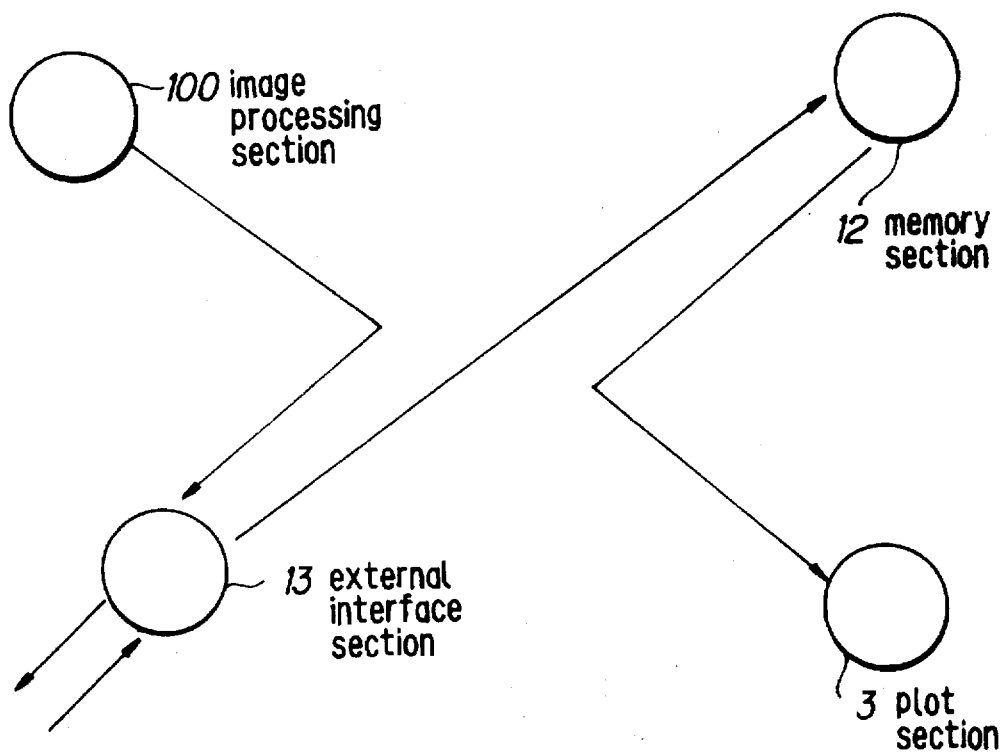
FIG. 49 is an explanatory view showing a data flow in a video bus.
Figure 52:
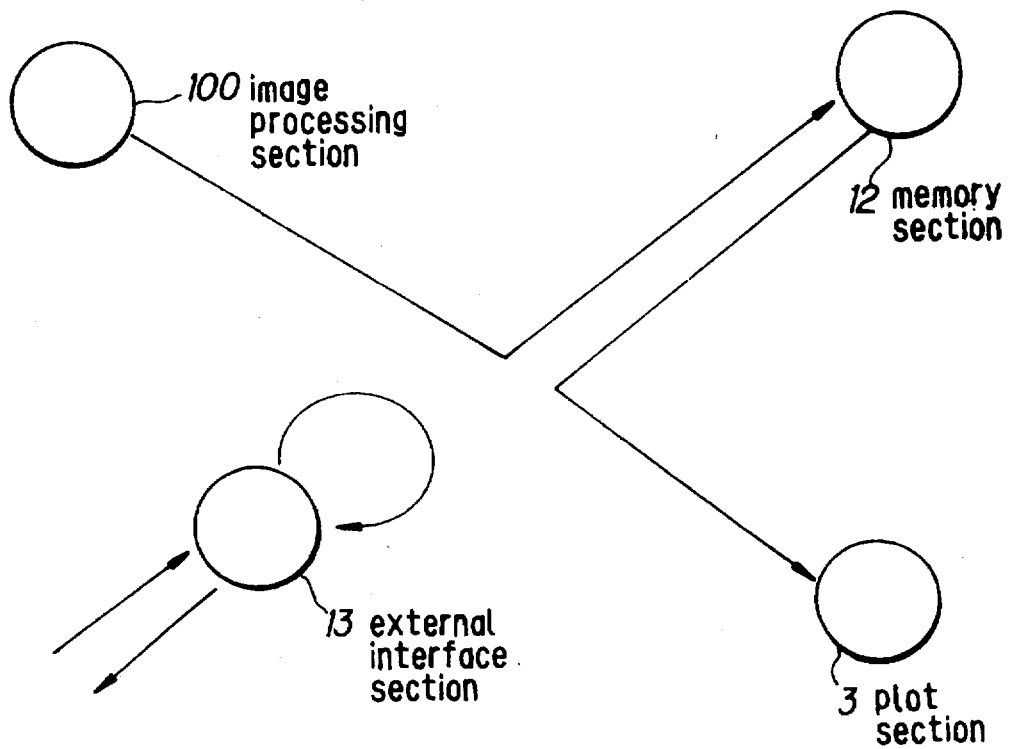
FIG. 52 is an explanatory view showing a data flow during relaying operation of a video bus.

With the configuration of the second video bus 102 as shown in FIG. 45, outline of image input control is as shown in FIG. 49 though FIG. 52. FIG. 49 is an explanatory view showing a sequential usage of various resources employed in the conventional technology, and in this configuration image data inputted from the scanner 2 is subjected to a processing corresponding to any of various types of operating mode in the image processing section 100, and then is transmitted, for instance, to a facsimile through the external interface section 13. The facsimile transmission enables transmission of image data for images read out to other facsimile machine. On the other hand, the receiving function makes it possible to receive image data transmitted from other facsimile machine, fetches the image data through the external interface section 13 into an image reader, and transfers the image data to the storage section 12. In the storage section 12, for instance, electronic sort is executed, and the image data is outputted to the plot section 3. In this step, a pixel clock from the image processing section 100 to the external interface section 13, a pixel clock from the external interface section 13 to the storage section 12, and a pixel clock from the storage section 12 to the plot section 3 may have a different value respectively.

Figure 50:
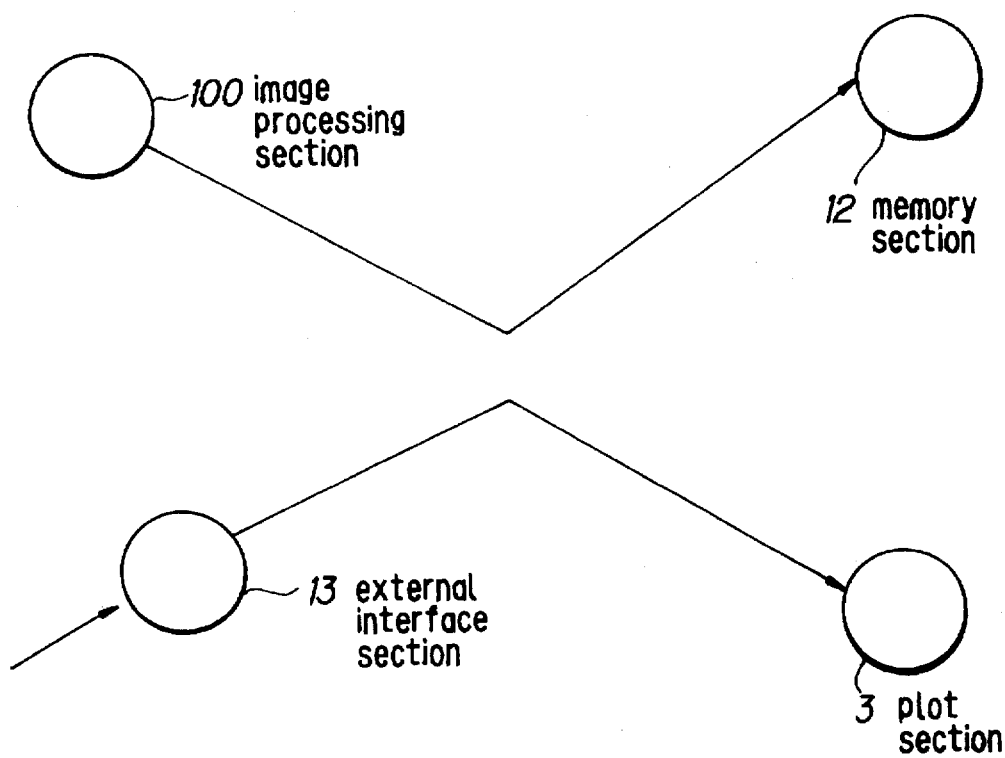
FIG. 50 is an explanatory view showing a data flow during concurrent operation of a video bus.

FIG. 50 shows an example in which operations of a read section and those of a write section are executed concurrently. Image data inputted from a scanner is subjected to various types of image processing, and is stored in the storage section 12. For instance, when reading a large volume of documents with the (INTO 1) function in the storage section 12, as the image reading device as a whole, only the read system is used, and the write system is held in the stand-by state. In the conventional types of image processing device, resources in the device have not always been utilized effectively, but in this embodiment, the plot section 3 is made available for other image processors through the external interface section 13. For instance, print output from a personal computer can be accepted, when operations in the read system and write system can be executed concurrently.

Figure 51:
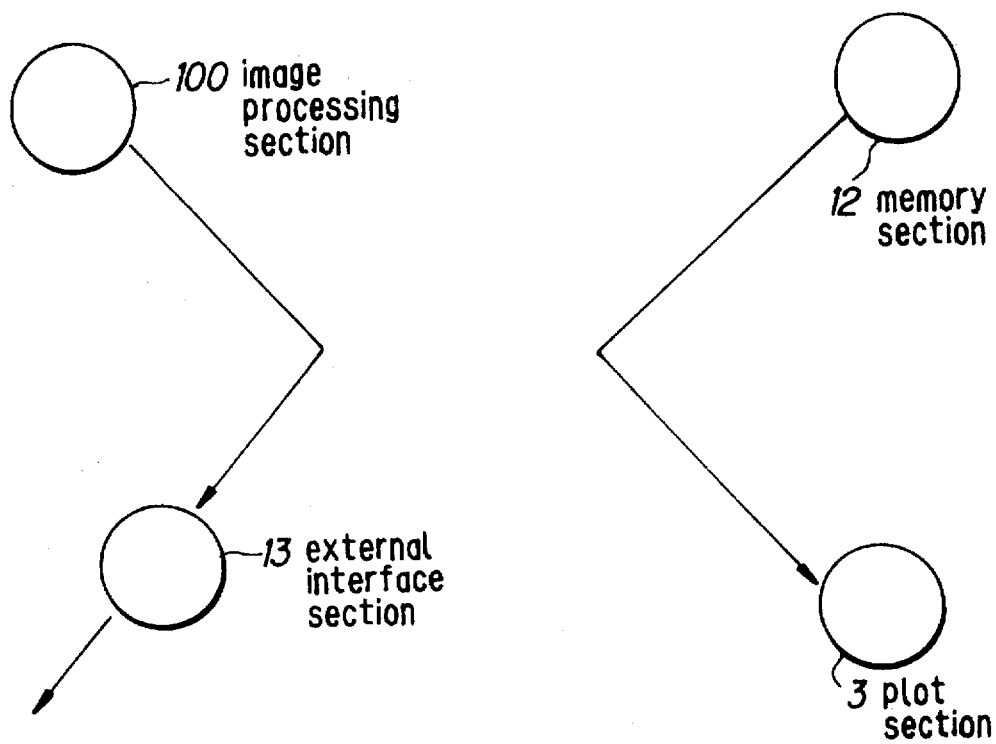
FIG. 51 is an explanatory view showing a data flow during concurrent operation of a video bus.

FIG. 51 shows another example in which operation in the read section and write section are executed concurrently. In this example, for instance, when the retention function in the storage section 12 is used for image data once scanned and accumulated in the storage section, if a large volume of images are outputted, the read section is kept in the stand-by state. In the stand-by state as described above, in this embodiment, to effectively utilize resources in the read section, the scanner section 2 is made available for other image processors through the external interface section 13.

For instance, document read may be executed for transmitting an image to a facsimile machine. With this configuration, operations of the read system and those of write system can be executed concurrently.

FIG. 52 shows a case where the external interface section 13 is used as a relaying function for a plurality of external image processors. Herein it is assumed for convenience of description that for instance a personal computer is connected thereto as an input device to the external interface section 13 and the image processor 100 according to this embodiment is connected thereto as an output device. When all the read system (scanner 2), write system (plotter 3) and storage section 12 are used for ordinary copying operation, if the external interface section 13 accepts an instruction for print out from a personal computer, in the conventional type of image regenerating device, output from the personal computer is kept in stand-by state, or the ordinary copying operation is compulsorily terminated, and measures for interruption of output from the personal computer is taken. However, in case of the configuration as shown in FIG. 52, output from a personal computer is not held in stand-by state, nor the copying operation not interrupted, and an output from a personal computer can be outputted via another image processor with the ordinary copying operation being continued.

As clearly understood from the above description, the present invention provides the effects as described below.

With the image processing apparatus according to the present invention wherein the image processing apparatus with a plurality of processing section each executing a specified processing to a digital image signal and executing the specified image processing set in each of the processing sections has a control means for freely setting a sequence of processing by these processing sections, it is possible to execute processing any times according to any processing sequence other than specified ones. Also, because processing can be executed any times according to any processing sequence, an optimal image processing can be executed to an inputted image. Furthermore, because the processing sequence can be set freely and processing can be executed any times, various types of image processing can be carried out with one configuration for image processing.

With the image processing apparatus according to the present invention wherein the control means comprises a plurality of buses each connected a plurality of processing sections and sending or receiving image signals to and from the processing sections, an selector for input selectively fetching an image signal from each bus into each processing section, a selector for output selecting a bus to which an image signal from each processing section is outputted, and a selector control section for controlling selection of a bus by a selector by switching these selectors, a processing sequence can freely be set by changing a sequence of selection by the input selector and output selector.

With the image processing apparatus according to the present invention wherein a digital image signal includes image data and phase data, processing can be executed according to any operating sequence without being restricted by a processing sequence even for an image signal including phase data.

With the image processing apparatus according to the present invention wherein a relation between a number of buses and a number of processing sections satisfied the expression of (Number of connected processing sections $-1$)$\leq$Number of buses, no problems occurs—even if the same processing section is specified twice, and a processing sequence can be changed freely.

With the image processing apparatus according to the present invention wherein processing sections include an image size changing section for executing image size changing in the main scanning direction to an image signal and a storage section for storing an image signal once and executing a specified processing for rotation, and the control means executes processing in the order of the image size changing section, storage section and then image size changing section, as an image signal is processed twice in the image size changing section, size of an image can be changed in both the main and auxiliary scanning directions.

With the image processing apparatus according to the present invention wherein the processing sections include a printing section for synthesizing an image signal with a page number, and a storage section for storing an image signal once and executing a specified processing for rotation, and the control means executes processing in the order of the printing section, storage section, and then printing section, as an image signal is processed twice in the printing section, prints each having a different orientation can be printed at different places.

With the image processing apparatus according to the present invention wherein the processing sections include a filter section for executing a processing for smoothing and/or emphasizing to an image signal, and a storage section for storing an image signal once and executing a specified processing for rotation, and the control means executes processing in the order of the filter section, storage section, and then filter section, as the image signals are processed twice in the filter section, the filter characteristics better than that previously specified can be effected.

With the image processing apparatus according to the present invention wherein the processing sections include an image size changing section for executing image size changing in the main scanning direction to an image signal and a storage section for storing an image signal once and executing a specified processing for rotation, and the control means executes in the order of the image size changing section, storage section, and then image size changing section, as image signals are processed twice in the image size changing section, size of an image can be changed according to a magnification higher than that set in the image size changing section.

With the image processing apparatus according to the present invention wherein the processing sections include an editorial section for mirroring and/or inclining an image, and a storage section for storing an image signal and executing a specified processing, and the control means executes processing in the order of the editorial section, storage section, and then editorial section, as image signals are processed twice in the editorial section, editorial works other than those previously set in the editorial section can be carried out.

With the image processing apparatus according to the present invention wherein the processing sections include an editorial section for mirroring and/or inclining an image, a storage section for storing an image signal once and executing a specified processing, and a tone processing section for executing a tone processing to an image, and the control means executes in the order of the editorial section, tone processing section, storage section and then editorial section, by executing a tone processing prior to a processing in the storage section, it is possible to change a screen angle used in the tone processing section.

With the image processing apparatus according to the present invention wherein the processing section include a shading section for correcting nonuniformity in an illuminating section, a filter section for converting frequency characteristics of an image signal, an image size changing section for changing size of an image in the main scanning section, a γ-conversion section for converting and processing inputted image data so that a copy with a specified degree of darkness will be obtained according to a copying mode and a notch prespecified value, an editorial section for processing image data, a printing section for synthesizing characters, a storage section for accumulating a large volume of image data, a tone processing section for executing at least one of multi-valued processing, error enlarging processing, multi-valued dither processing and binary value coding processing, an external interface section for sending signals to or receiving signals from an external device, a plot section for printing characteristics and images, and the control means executes processing in the order of the shading section, space filter section, image size changing section, γ-conversion section, editorial section, printing section, storage section, tone processing section, external interface section, and plot section, as image data subjected to editorial works, printing processing is stored once in the storage section and then subjected to a tone processing, image processing can be executed without having any collapse generated in image data having been subjected to memory compression nor in phase data.

With the image processing apparatus according to the present invention wherein a sequence of processing by the control means according to the present invention is set in the order of the shading section, a filter section, an image size changing section, a γ-conversion section, a storage section, a tone processing section, an editorial section, a printing section, an external interface section, and a plot section, as data subjected to γ-conversion is once stored in the storage section and then subjected to a tone processing, an image processing can be executed without causing any collapse in image data subjected to memory compression nor in phase data.

With the image processing apparatus according to the present invention wherein a sequence of processing by the control means according to the present invention is set in the order of a shading section, a filter section, an image size changing section, a γ-conversion section, an editorial section, a printing section, a storage section, an external interface section, a tone processing section, and a plot section, as image data from an external device is outputted via the tone processing section making use of an external interface, access to a tone processing function of the external device is possible.

With the image processing apparatus according to the present invention wherein a sequence of processing by the control means according to the present invention is set in the order of a shading correcting section, an external interface section, a filter section, an image size changing section, a γ-conversion section, an editorial section, a printing section, a storage section, a tone processing section, and a plot section, as image data from an external device is outputted via the filter section, image size changing section, γ-conversion section, editorial section, printing section, storage section, and tone processing section making use of an external interface, access by the external device to the filter section, image size changing section, γ-conversion section, editorial section, printing section, storage section, and tone processing section is possible.

With the image processing apparatus according to the present invention wherein a sequence of processing by the control means according to the present invention is set in the order of a shading section, a filter section, an image size changing section, a γ-conversion section, a tone processing section, a printing section, an editorial section, a storage section, an external interface device, and a plot section, as output data from the printing section passes through the editorial section and the storage section, image data having been subjected to character synthesization can be processed.

With the image processing apparatus according to the present invention wherein a sequence of processing by the control means according to the present invention is set in the order of a shading section, a filter section, an image size changing section, a γ-conversion section, a tone processing section, an editorial section, a printing section, an external interface section, a storage section, and a plot section, as image data from the external interface section passes through the storage section, image data in an external device can electronically be sorted.

With the image processing apparatus according to the present invention comprising a first video bus for integrating various types of internal processing blocks including an input section and an internal processing sections executing various types of image processing to an image signal inputted from the input section and a second video bus connected to this first video bus for integrating external processing blocks including an external storage section, an external interface section, and an output section which can freely select an image path between the external processing blocks, as an image path to the external storage section, external interface section, and output section can freely be selected, resources for write and read in an image processing apparatus can effectively be utilized.

With the image processing apparatus according to the present invention wherein selection of an external processing block in the second video bus is executed by an image path selecting means for selecting an image path as well as by a signals electing means for selecting an image signal, various types of control signal and a clock for the system within said image path selecting means according to a select signal inputted from this image path selecting means, as image data required for an interface with other image processing apparatus, a control signal, and a clock can be selected as a group, concurrent operations with other image processing apparatus can easily be carried out.

With the image processing apparatus according to the present invention wherein at least two external units are connected to the external interface section and I/O control for said external units are executed by a unit selecting means, an external unit for input and an external unit for output can independently be connected, so that data transfer between the two external units can be controlled independently from processing functions in the image processing apparatus.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus, comprising:

a plurality of processing sections each executing a specified type of processing on a digital image signal; and a controller coupled to said plurality of processing sections and configured for setting a sequence of processing on an image signal by said plurality of processing sections, according to a signal indicative of said sequence of processing;

wherein said controller comprises:

a plurality of buses connecting said plurality of processing sections and carrying image signals, an input selector coupled to the plurality of buses and a processing section of the plurality of processing sections and configured for selectively fetching an image signal from one of the plurality of buses into said processing section, an output selector coupled to the plurality of buses and a processing section of the plurality of processing sections and configured for selecting one of the plurality of buses to which an image signal from said processing section is output, and a selector control section coupled to said input selector and said output selector and configured for selecting one of the plurality of buses by means of switching said input selector and said output selector.

2. An image processing apparatus according to claim 1, wherein the number of said plurality of buses is at least as great as one less than the number of said plurality of processing sections.

3. An image processing apparatus according to claim 1, wherein:

said plurality of processing sections includes an image size changing section for changing the image size of an image signal in the main scanning direction, and a storage section for storing an image signal and rotating an image; and said controller is configured for setting the sequence of processing in the order of the image size changing section, the storage section, and then the image size changing section.

4. An image processing apparatus according to claim 1, wherein:

said plurality of processing sections includes a printing section for synthesizing an image signal with a page number, and a storage section for storing an image signal and rotating an image; and said controller is configured for setting the sequence of processing in the order of the printing section, the storage section, and then the printing section.

5. An image processing apparatus according to claim 1, wherein:

said plurality of processing sections includes a filter section for smoothing and/or emphasizing an image signal, and a storage section for storing an image signal and rotating an image; and said controller is configured for setting the sequence of processing in the order of the filter section, the storage section, and then the filter section.

6. An image processing apparatus according to claim 1, wherein:

said plurality of processing sections includes an image size changing section for changing in the main scanning direction the image size of an image signal and a storage section for storing an image signal; and said controller is configured for setting the sequence of processing in the order of the image size changing section, the storage section, and then the image size changing section.

7. An image processing apparatus according to claim 1, wherein:

said plurality of processing sections includes an editorial section for mirroring and/or inclining an image and a storage section for storing an image signal; and said controller is configured for setting the sequence of processing in the order of the editorial section, the storage section, and then the editorial section.

8. An image processing apparatus according to claim 1, wherein:

said plurality of processing sections includes an editorial section for mirroring and/or inclining an image, a storage section for storing an image signal, and a tone processing section for processing the tone of an image; and said controller is configured for setting the sequence of processing in the order of the editorial section, the tone processing section, the storage section, and then the editorial section.

9. An image processing apparatus according to claim 1, wherein:

said plurality of processing sections includes:

a shading section for correcting nonuniformity in an image caused by an illuminating system, a filter section for converting frequency characteristics of an image signal, an image size changing section for changing the size of an image in the main scanning direction, a γ-conversion section for converting and processing input image data so that a copy with a specified degree of darkness will be obtained according to a copying mode and a notch preset value, an editorial section for processing image data, a printing section for synthesizing characters, a storage section for storing image data, a tone processing section for executing at least one of multi-valued coding processing, error enlarging processing, multi-valued dither processing, and binary value coding processing, an external interface section for sending signals to or receiving signals from an external device, and a plot section for printing characters and images; and said controller is configured for setting the sequence of processing in the order of the shading section, the filter section, the image size changing section, the γ-conversion section, the editorial section, the printing section, the storage section, the tone processing section, the external interface section, and then the plot section.

10. An image processing apparatus according to claim 1, wherein:

said plurality of processing sections includes:

a shading section for correcting nonuniformity in an image caused by an illuminating system, a filter section for converting frequency characteristics of an image signal, an image size changing section for changing the size of an image in the main scanning direction, a γ-conversion section for converting and processing input image data so that a copy with a specified degree of darkness will be obtained according to a copying mode and a notch preset value, an editorial section for processing image data, a printing section for synthesizing characters, a storage section for accumulating image data, a tone processing section for executing at least one of multi-valued coding processing, error enlarging processing, multi-valued dither processing, and binary value coding processing, an external interface section for sending signals to or receiving signals from an external device, and a plot section for printing characters and images; and said controller is configured for setting the sequence of processing in the order of the shading section, the filter section, the image size changing section, the γ-conversion section, the storage section, the tone processing section, the editorial section, the printing section, the external interface section, and then the plot section.

11. An image processing apparatus according to claim 1, wherein:

said plurality of processing sections includes:

a shading section for correcting nonuniformity in an image caused by an illuminating system, a filter section for converting frequency characteristics of an image signal, an image size changing section for changing the size of an image in the main scanning direction, a γ-conversion section for converting and processing input image data so that a copy with a specified degree of darkness will be obtained according to a copying mode and a notch preset value, an editorial section for processing image data, a printing section for synthesizing characters, a storage section for accumulating image data, a tone processing section for executing at least one of multi-valued coding processing, error enlarging processing, multi-valued dither processing, and binary value coding processing, an external interface section for sending signals to or receiving signals from an external device, and a plot section for printing characters and images; and said controller is configured for setting the sequence of processing in the order of the shading section, the filter section, the image size changing section, the γ-conversion section, the editorial section, the printing section, the storage section, the external interface section, the tone processing section, and then the plot section.

12. An image processing apparatus according to claim 1, wherein:

said plurality of processing sections includes:

a shading section for correcting nonuniformity in an image caused by an illuminating system, a filter section for converting frequency characteristics of an image signal, an image size changing section for changing the size of an image in the main scanning direction, a γ-conversion section for converting and processing input image data so that a copy with a specified degree of darkness will be obtained according to a copying mode and a notch preset value, an editorial section for processing image data, a printing section for synthesizing characters, a storage section for accumulating image data, a tone processing section for executing at least one of multi-valued coding processing, error enlarging processing, multi-valued dither processing, and binary value coding processing, an external interface section for sending signals to or receiving signals from an external device, and a plot section for printing characters and images; and said controller is configured for setting the sequence of processing in the order of the shading section, the external interface section, the filter section, the image size changing section, the γ-conversion section, the editorial section, the printing section, the storage section, the tone processing section, and then the plot section.

13. An image processing apparatus according to claim 1, wherein:

said plurality of processing sections includes:

a shading section for correcting nonuniformity in an image caused by an illuminating system, a filter section for converting frequency characteristics of an image signal, an image size changing section for changing the size of an image in the main scanning direction, a γ-conversion section for converting and processing input image data so that a copy with a specified degree of darkness will be obtained according to a copying mode and a notch preset value, an editorial section for processing image data, a printing section for synthesizing characters, a storage section for accumulating image data, a tone processing section for executing at least one of multi-valued coding processing, error enlarging processing, multi-valued dither processing, and binary value coding processing, an external interface section for sending signals to or receiving signals from an external device, and a plot section for printing characters and images; and said controller is configured for setting the sequence of processing in the order of the shading section, the filter section, the image size changing section, the T-conversion section, the tone processing section, the printing section, the editorial section, the storage section, the external interface section, and then the plot section.

14. An image processing apparatus according to claim 1, wherein;

said plurality of processing sections includes:

a shading section for correcting nonuniformity in an image caused by an illuminating system, a filter section for converting frequency characteristics of an image signal, an image size changing section for changing the size of an image in the main scanning direction, a γ-conversion section for converting and processing input image data so that a copy with a specified degree of darkness will be obtained according to a copying mode and a notch preset value, an editorial section for processing image data, a printing section for synthesizing characters, a storage section for accumulating image data, a tone processing section for executing at least one of multi-valued coding processing, error enlarging processing, multi-valued dither processing, and binary value coding processing, an external interface section for sending signals to or receiving signals from an external device, and a plot section for printing characters and images; and said controller is configured for setting the sequence of processing in the order of the shading section, the filter section, the image size changing section, the γ-conversion section, the tone processing section, the editorial section, the printing section, the external interface section, the storage section, and then the plot section.

* * * * *